United States Patent
Nystad et al.

(10) Patent No.: US 8,106,921 B2
(45) Date of Patent: Jan. 31, 2012

(54) DIFFERENTIAL ENCODING USING A 3D GRAPHICS PROCESSOR

(75) Inventors: Jorn Nystad, Trondheim (NO); Edvard Sorgard, Trondheim (NO); Borgar Ljosland, Trondheim (NO); Mario Blazevic, Lena (NO)

(73) Assignee: Arm Norway AS, Trondheim (NO)

(*) Notice: Subject to any disclaimer, the term of this patent is extended or adjusted under 35 U.S.C. 154(b) by 364 days.

(21) Appl. No.: 10/569,345

(22) PCT Filed: Aug. 20, 2004

(86) PCT No.: PCT/GB2004/003598
§ 371 (c)(1),
(2), (4) Date: Jan. 30, 2007

(87) PCT Pub. No.: WO2005/020582
PCT Pub. Date: Mar. 3, 2005

(65) Prior Publication Data
US 2007/0146380 A1    Jun. 28, 2007

(30) Foreign Application Priority Data
Aug. 21, 2003   (GB) .................................. 0319697.9

(51) Int. Cl.
*G09G 5/00* (2006.01)
(52) U.S. Cl. ........ 345/614; 345/581; 345/582; 345/555; 382/166; 382/236; 382/239; 382/250; 348/407.1; 348/410.1; 348/417.1; 348/420.1; 348/422.1
(58) Field of Classification Search .......................... None
See application file for complete search history.

(56) References Cited

U.S. PATENT DOCUMENTS

| 6,330,281 | B1 | 12/2001 | Mann et al. ............... 375/240.12 |
| 6,459,737 | B1 | 10/2002 | Jiang |
| 6,552,723 | B1 | 4/2003 | Duluk, Jr. et al. ............. 345/419 |
| 6,577,679 | B1 * | 6/2003 | Apostolopoulos ....... 375/240.12 |
| 6,633,297 | B2 * | 10/2003 | McCormack et al. ........ 345/506 |
| 6,636,223 | B1 * | 10/2003 | Morein .......................... 345/581 |

(Continued)

FOREIGN PATENT DOCUMENTS
EP           0588653          3/1994
(Continued)

OTHER PUBLICATIONS

Communication of a notice of opposition in corresponding EP Application 04768155.6 dated Jul. 23, 2008.

(Continued)

*Primary Examiner* — Antonio Caschera
(74) *Attorney, Agent, or Firm* — Nixon & Vanderhye P.C.

(57) ABSTRACT

A 3D graphics rendering pipeline is used to carry out data comparisons for motion estimation in video data encoding. Video data for the pixel block of the video frame currently being encoded is loaded into the output buffers of the rendering pipeline. The video data for the comparison pixel blocks from the reference video frame is stored as texture map values in the texture cache of the rendering pipeline.

Once the sets of pixel data for comparison have been stored, the rendering pipeline is controlled to render a primitive having fragment positions and texture coordinates corresponding to the data values that it is desired to compare. As each fragment is rendered, the stored and rendered fragment data is compared by fragment compare unit and the determined differences in the data values are accumulated in an error term register.

14 Claims, 4 Drawing Sheets

U.S. PATENT DOCUMENTS

| | | | |
|---|---|---|---|
| 7,558,428 | B2 | 7/2009 | Shen et al. |
| 7,813,570 | B2 | 10/2010 | Shen et al. |
| 2003/0151608 | A1 | 8/2003 | Chung et al. |

FOREIGN PATENT DOCUMENTS

| | | |
|---|---|---|
| EP | 0899959 | 3/1999 |
| EP | 1274249 | 1/2003 |
| GB | 2380383 | 4/2003 |
| JP | 8149458 | 6/1996 |
| WO | WO 2004/095708 | 11/2004 |

OTHER PUBLICATIONS

F. Kelly et al, "General Purpose Graphics Hardware for Accelerating Motion Estimation" Irish Machine Vision and Image Processing Conference (IMVIP), Sep. 2003.

I. Ahmad et al, "Video compression with parallel processing" Parallel Computing, vol. 28, Aug. 2002, pp. 1039-1078.

J. Kruger et al, "Linear Algebra Operators for GPU Implementation of Numerical Algorithms" ACM Transactions on Graphics, 22(3), Jul. 2003, pp. 908-916.

T. Purcell et al, "Ray Tracing on Programmable Graphics Hardware" ACM Transactions on Graphics, 21(3), Jul. 2002, pp. 703-712.

E. Larsen et al "Fast Matrix Multiplies using Graphics Hardware" Supercomputing 2001, Nov. 2001.

V. Kwatra et al, "GraphCut Textures: Image and Video Synthesis Using Graph Cuts" ACM Transactions on Graphics, 22(3), Jul. 2003, pp. 277-286.

R. Yang et al, "Fast image segmentation and smoothing using commodity graphics hardware" Journal of Graphics Tools, vol. 7, Issue 4, Dec. 2002, pp. 91-100.

L. Wei et al, "Order-Independent Texture Synthesis" Technical Report TR-2002-01, Computer Science Department, Stanford University, Apr. 2002.

X. Tong et al, "Synthesis of Bidirectional Texture Functions on Arbitrary Surfaces" ACM Transactions on Graphics, 21(3), Jul. 2002, pp. 665-672.

C. Thompson et al, "Using Modern Graphics Architectures for General Purpose Computing: A Framework and Analysis" IEEE/ACM International Symposium on Microarchitecture, 2002.

K. Moreland et al, "The FFT on a GPU" Proceedings of the ACM SIGGRAPH/EUROGRAPHICS Conference on Graphics Hardware, 2003.

http://www.infc.ulst.ac.uk/informatics/events/imvip03/call.html relating to above reference F. Kelly et al, "General Purpose Graphics Hardware for Accelerating Motion Estimation" 3 pages.

Ahmad, et al., "Video Compression with Parallel Processing", Parallel Computing 28 (2002) pp. 1039-1078.

Decision Rejecting Opposition dated Mar. 3, 2010 in EP 04 768 155.6.

F. Kelly et al, "General Purpose Graphics Hardware for Accelerating Motion" Irish Machine Vision and Image Processing Conference (IMVIP), Sep. 3, 2003.

Conference Notice for IMVIP, Sep. 3-5, 2003.

I. Ahmad et al, "Video compression with parallel processing" Parallel Computing, vol. 28, Issue 7-8, Aug. 2002, pp. 1039-1078.

J. Kruger et al, "Linear Algebra Operators for GPU Implementation of Numerical Algorithms" ACM Transactions on Graphics, 22(3), Jul. 2003.

T. Purcell et al, "Ray Tracing on Programmable Graphics Hardware" ACM Transactions on Graphics, 21(3), Jul. 2002.

E. Larsen et al, "Fast Matrix Multiples using Graphics Hardware" Supercomputing 2001, Nov. 2001.

V. Kwatra et al, "Graphcut Textures: Image and Video Synthesis Using Graph Cuts" ACM Transactions on Graphics, 22(3), Jul. 2003, pp. 277-286.

R. Yang et al, "Fast Image Segmentation and Smoothing Using Commodity Graphics Hardware" Journal of Graphics Tools, vol. 7, Issue 4, Dec. 2002, pp. 91-100.

L. Wei et al, "Order-Independent Texture Synthesis" Technical Report TR-2002-01, Computer Science Department, Stanford University, Apr. 2002.

X. Tong et al, "Synthesis of Bidirectional Texture Functions on Arbitrary Surfaces" ACM Transactions on Graphics, 21(3), Jul. 2002, pp. 665-672.

C. Thompson et al, "Using Modern Graphics Architectures for General-Purpose Computing: A Framework and Analysis" International Symposium on Microarchitecture, Nov. 2002.

K. Moreland et al, "The FFT on a GPU" Proceedings of the ACM SIGGRAPH/EUROGRAPHICS Conference on Graphics Hardware, Jul. 26, 2003.

V. Bhaskaran et al, "Image and Video Compression Standards—Algorithms and Architectures" Second Edition, 1997, pp. xiii-xvi, 1-5, 99-104, 253-259, 283-302 and 329-358.

L. Guan et al, "Multimedia Image and Video Processing" 2001, pp. 19-20, 131-132, 201-235.

B. Furht, "Handbook of Multimedia Computing" 1999, pp. 447-466, 737-750.

C. Chen et al, "Visual Information Representation, Communication, and Image Processing" 1999, pp. 1-6, 129-161.

S. Nishio et al, "Advanced Multimedia Content Processing" First International Conference, AMCP'98, Nov. 1998, pp. 301-326.

C. Chung et al, "Design and Evaluation of a Multimedia Computing Architecture Based on a 3D Graphics Pipeline" Proceedings of the IEEE International Conference on Application-Specific Systems, Architectures, and Processors, 2002.

\* cited by examiner

DIFFERENTIAL ENCODING USING A 3D GRAPHICS PROCESSOR

This application is the US national phase of international application PCT/GB2004/003598, filed in English on Aug. 20, 2004, which designated the US. PCT/GB2004/003598 claims priority to GB Application No. 0319697.9 filed Aug. 21, 2003. The entire contents of these applications are incorporated herein by reference.

BACKGROUND OF THE INVENTION

1. Field of the Invention

The present invention relates to a method and an apparatus suitable for use with differential encoding and decoding techniques, and in particular to such a method and apparatus suitable for use with video compression encoding and decoding techniques.

2. Discussion of Prior Art

As is known in the art, differential encoding involves comparing portions of data with one another and using information relating to the differences between the portions of data rather than the entire data portions themselves to represent the "original" data. This has the advantage that a smaller volume of data is required to encode a given amount of original data, which can be important where, for example, the data transmission capacity is restricted.

Such differential encoding techniques are particularly suitable for the compression of (digital) video data, because although there may be 25 to 30 video frames per second, within a given scene in a video sequence, each frame will typically be very similar to the adjacent frames, with the differences only often being due to "objects" in the frames moving to different positions. This means that much of the video data necessary to reproduce successive frames in a video sequence is substantially identical as between frames.

The MPEG video compression standards and other related algorithms, for example, therefore use differential encoding to compress video data, e.g. for transmission or storage purposes.

Generally, in differential encoded video data each video frame is divided into a plurality of blocks (16×16 pixel blocks in the case of MPEG encoding) and each block of the frame is encoded individually. Three types of data "block" are usually used (e.g. stored or transmitted). These are commonly referred to as INTRA (I) blocks, INTER (P) blocks and bi-directionally predicted (B) blocks.

INTRA (I) blocks are coded frame blocks which contain no predicted or differenced data, i.e. are complete data blocks which are not dependent on any previous (or future) frame blocks. INTER (P) blocks and bi-directionally predicted (B) blocks are differentially coded frame blocks that describe the differences between the "current" block and a "prediction" frame block created from video data in frames before the current frame, and, in the case of B blocks, also video data in frames generated after the current frame. The "prediction" frame block that the differences encoded in P and B blocks are referenced to could, for example, simply comprise a preceding I (i.e. complete) frame block, or could be a more complex frame block predicted, e.g., from an I block and one or more preceding P blocks.

As in such arrangements P and B blocks only contain data relating to differences between blocks in frames in the original video data, they are considerably smaller than I blocks, and so the overall amount of data that must be transmitted or stored can be reduced by using P and/or B blocks to encode the data. (However, complete, i.e. I, blocks must still be stored or transmitted at intervals to allow the complete original data to be reconstructed.)

As is known in the art, an important aspect of such differential encoding of video data is identifying which areas of the video frames being compared are most similar to each other (such that there is then a reduced or minimum number of differences to be encoded). This process is complicated by the fact that, typically, the area of the "prediction" (reference) frame that most closely matches a given block or area in the current frame will not be in the same position within the reference frame as that area is in the current frame. This is because the most closely matching areas in the video frames will tend to move between frames, as objects in the video sequence move around.

Differential encoding of video data typically therefore involves two aspects: firstly identifying the location in a "reference" video frame of the area in that frame that most closely matches the area (block) of the video frame currently being encoded, and then determining the differences between the two areas in the two frames (i.e. the current and the reference frame).

The encoded data accordingly usually comprises a vector value pointing to the area of a given reference frame to be used to construct the appropriate area (block) of the frame currently being constructed, and data describing the differences between the two areas. This thereby allows the video data for the area of the frame currently being constructed to be constructed from video data describing the area in the reference frame pointed to by the vector value and the difference data describing the differences between that area and the area of the video frame currently being constructed.

The process of identifying which areas in different video frames most (or sufficiently) closely match and accordingly determining the vector to be stored to point to the relevant area in the reference video frame is usually referred to as "motion estimation". This process is usually carried out by comparing video data values (usually luminance values) for each pixel in a given area or block (typically a 16×16 pixel block in MPEG systems) of the video frame currently being encoded with a succession of corresponding-sized pixel blocks in the reference video frame until the closest (or a sufficiently close) match in terms of the relevant video data values is found. The vector pointing to the so-identified pixel block in the reference frame is then recorded and used for the encoded data stream. The relative closeness or match between relevant video data for the pixel blocks being compared is assessed using difference comparison or cost functions, such as a mean-squared difference (MSD) function.

However, because they require a comparison between a large number of pixel video data values (e.g. 256 pixel values where 16×16 pixel blocks are being tested), such "motion estimation" processes are computationally intensive, even if the range of the search over the reference frame (i.e. the region of the reference frame over which the search for the closest matching frame area is carried out) is deliberately limited. This can be disadvantageous generally, but particularly is so where the processing power of the encoding system may be limited. This could, e.g., particularly be the case where it is desired to encode "real time" video data using, e.g., a mobile device that may accordingly have limited processing capacity.

The Applicants have recognised that it is becoming increasingly common to include in microprocessor based devices, including mobile devices, some form of 3D graphics processor, i.e. a device that is designed specifically for carrying out the operations necessary to process and display three-dimensional graphics. (The 3D graphics processor will, as is known in the art, typically act as a slave of the main "host", general microprocessor of the device and be used to carry out 3D graphics processing operations so that the general microprocessor of the device does not have to.)

As is known in the art, 3D graphics processing operations are usually carried out on (i.e. using) discrete graphical entities usually referred to as "fragments". Each such fragment will usually correspond to a single pixel (picture element) in the final display (since as the pixels are the singularities in the final picture to be displayed, there will usually be a one-to-one mapping between the "fragments" the 3D graphics processor operates on and the pixels in the display). However, it can be the case that there is not a direct correspondence between "fragments" and "pixels", where, for example, particular forms of post-processing such as down-scaling are carried out on the rendered image prior to displaying the final image.

Thus, two aspects of 3D graphics processing that are typically carried out on a 3D graphics processor are the "rasterising" of graphics "primitive" (or polygon) position data to graphics fragment position data (i.e. determining the (x, y) positions of the graphics fragments to be used to represent each primitive in the scene to be displayed), and then "rendering" the "rasterised" fragments (i.e. colouring, shading, etc., the fragments) for display on a display screen.

(In 3D graphics literature, the term "rasterisation" is sometimes used to mean both primitive conversion to fragments and rendering. However, herein "rasterisation" will be used to refer to converting primitive data to fragment addresses only.)

The rendering process basically involves deriving a colour value for each graphics fragment to be displayed and typically is carried out in a pipelined process (the so-called "rendering pipeline").

The rendering process (e.g. pipeline) typically receives as an input sets of graphics fragments in the form of two-dimensional arrays representing primitives to be displayed. For each fragment in the array, data necessary to display the fragment is then determined. Such data typically comprises red, green and blue (RGB) colour values for each fragment (which will basically determine the colour of the fragment on the display), and a so-called "Alpha" (transparency) value for each fragment. These RGB and alpha data values are usually referred to as being stored in RGB and alpha data channels of each graphics fragment (i.e. such that each graphics fragment has four data channels in which data values for that fragment can be stored).

In the rendering process, the individual fragments of the array (i.e. in practice their associated fragment data, e.g. RGB and alpha values) pass down the rendering pipeline one after another. As each fragment passes down the pipeline, it is firstly allocated initial RGB and alpha values, based on, e.g., colour and transparency data recorded for the vertices of the primitive to which the fragment belongs. Operations such as texturing, fogging, and blending, etc., are then carried out on the fragment data as it passes down the rendering pipeline. These operations modify the initial RGB and alpha values set for each fragment, such that each fragment emerges from the pipeline with an appropriate set of RGB and alpha values to allow that fragment to be displayed correctly on the display screen.

As each fragment emerges from the rendering pipeline it is stored (i.e. its final RGB and alpha values are stored) ready for display of the fragment on the display screen. This process is repeated for all the fragments in the scene area currently being rendered.

It is also the case, as is known in the art, that in 3D graphics rendering processes, it is possible (and indeed common) for a new fragment provided to the rendering pipeline to have the same fragment (e.g. pixel) position in the display as a fragment that has already passed down the pipeline (and is, e.g., stored at the end of the pipeline ready for display). When such a new fragment reaches the end of the graphics pipeline, there will then be two fragments, each having their own data (e.g. RGB and alpha) values, one at the end of the pipeline and one stored for display, having the same fragment (pixel) position. This conflict is usually resolved in 3D graphics processing operations by, e.g., rejecting one of the two fragments based on the relative depth of the fragments in the scene to be displayed.

However, the Applicants have recognised that this aspect of 3D graphics processor rendering pipelines provides a facility for comparing data relating to two fragments having the same position in a given two-dimensional array of fragments, since, in effect, the rendering pipeline can be arranged to provide at its end two sets of fragment data for the same fragment position. That data could, accordingly, if desired, be compared. Furthermore, the fragment data generation is carried out for two-dimensional arrays of fragments (e.g. corresponding to a 3D graphics primitive to be displayed).

The Applicants have recognised that accordingly, and as will be explained further below, 3D graphics rendering pipelines handle two dimensional arrays of graphic fragments in a manner that allows two different sets of fragment data for a given position in the array to be compared (e.g. by sending a first fragment for a given position in the array down the rendering pipeline such that the data for that fragment is stored at the end of the rendering pipeline and then sending a second fragment for that fragment position down the rendering pipeline such that a new set of fragment data for that fragment position is generated by the rendering pipeline). The Applicants have further recognised that this means that a 3D graphics rendering pipeline treats fragment data in a manner that is compatible with the processes required for "motion estimation" in differential encoding and video compression techniques (since such processes basically entail comparing data on a pixel-by-pixel basis for two-dimensional areas in different video frames).

The Applicants have accordingly recognised that because a 3D graphics rendering pipeline carries out many of these "motion estimation" relevant functions in hardware, it provides the facility to hardware accelerate the "motion estimation" process (i.e. to allow the computationally intensive motion estimation operations to be carried out in hardware on the 3D graphics processor, rather than having to be carried out (e.g. in software) on a more general microprocessor or CPU (central processing unit)).

Thus, the Applicants have recognised that in a 3D-graphics enabled microprocessor system, the 3D graphics processor could be used to carry out "motion estimation" processes, thereby reducing the computational burden on the general microprocessor, e.g., CPU, of the system. This could also allow, for example, a mobile or less powerful device that is equipped with a 3D graphics processor still to carry out motion estimation and accordingly video compression and differential encoding in situations where the general microprocessor or CPU of the device may not in itself be able to do so. That could allow, for example, real-time video encoding and streaming by mobile devices that may not otherwise be able to carry out such functions. The present invention also removes the need to provide an additional dedicated hardware device for motion estimation acceleration where the system already includes a 3D graphics processor.

SUMMARY OF THE INVENTION

Thus, according to a first aspect of the present invention, there is provided a method of comparing data, comprising:

using a 3D graphics processing system to carry out the data comparison.

According to a second aspect of the present invention, there is provided a method of comparing blocks of data, comprising:

using a 3D graphics processing system to compare the data blocks.

According to a third aspect of the present invention, there is provided a method of comparing data comprising:

storing in a memory unit of or accessible to a 3D graphics rendering module a set of fragment data for a two dimensional array of graphics fragments;

using the 3D graphics rendering module to render one or more graphics fragments having the same positions as the fragments in the stored two dimensional array of fragments to generate fragment data for those fragments; and comparing fragment data of the rendered fragments with fragment data stored for the fragments in the corresponding fragment positions in the stored two dimensional array of graphics fragments.

According to a fourth aspect of the present invention, there is provided a 3D graphics processing rendering module, comprising:

means for storing a set of fragment data for a two dimensional array of graphics fragments;

means for rendering one or more graphics fragments having the same positions as the fragments in the stored two dimensional array of fragments to generate fragment data for those fragments; and means for comparing fragment data of the rendered fragments with fragment data stored for the fragments in the corresponding fragment positions in the stored two dimensional array of graphics fragments.

Thus, the present invention uses a 3D graphics rendering module to compare graphics fragment data by storing one set of fragment data and then rendering graphics fragments having the corresponding fragment positions to provide a second set of fragment data that is then compared with the stored fragment data for each corresponding fragment position. In other words, the rendering module is arranged to compare fragment data values for two fragments having the same fragment position.

In this way, the present invention provides a mechanism for using a 3D graphics rendering module (e.g. pipeline) to compare data of different graphics fragments that have the same position in a given two-dimensional block of fragments, i.e. for carrying out steps necessary for, for example, motion estimation for differential video encoding. This provides the ability to carry out the data comparison, necessary for, e.g. motion estimation, in hardware, which, as discussed above, is and can be advantageous.

It can be seen from the above that the present invention basically compares sets of fragment data position-by-position over a two dimensional array of fragment positions by storing one set of fragment data for the array and then rendering fragments having each position in the array to generate a second data value for each fragment position in the array for comparison with the stored data value for that fragment position.

The 3D graphics rendering module can be any suitable such module that can handle arrays of graphics fragments in the appropriate manner. It will typically, as discussed above be implemented as a pipelined arrangement (i.e. one in which the 3D graphics processing rendering operations are carried out as a series of successive steps), i.e. comprise a 3D graphics rendering pipeline. Such a rendering "pipeline" could (and typically would) be implemented as a pipelined semiconductor device, although as is known in the art that is not essential (and references to a 3D graphics rendering pipeline herein should be construed accordingly). The rendering module could have its rendering functions "fixed", or its rendering functions could be programmable to some extent (or fully), such as in "pixel shader" and "fragment shader" renderers (where, as is known in the art, the rendering logic between the rasteriser, any texture mapping data retrieving (fetching), and the output buffers of the renderer, is programmable with small programs ("pixel/fragment shaders") that run on each fragment, so that, e.g., an application developer can have more freedom to vary the effects achievable with the rendering module).

Where the rendering module is in the form of a pipelined arrangement, it is preferred that the stored array of graphics fragments data is stored at the end of the rendering pipeline, and the comparison (rendered) set of fragment data is provided by passing graphics fragments down the rendering pipeline to generate that data. The fragment data of the rendered fragments is then preferably compared with the stored fragment data when the fragments passing down the pipeline reach the end of the pipeline. Other arrangements would be possible if desired.

In such an embodiment, the 3D graphics rendering pipeline would accordingly be used to compare two sets of fragment data position-by-position over a two dimensional array of fragment positions by storing one set of fragment data for the array at the end of the rendering pipeline, and then passing, in succession, fragments having each position in the array down the rendering pipeline to provide another data value or values for each fragment position in the array for comparison with the stored data value for that fragment position.

Thus, according to a fifth aspect of the present invention, there is provided a method of comparing data, comprising:

storing at the end of a 3D graphics rendering pipeline a set of fragment data for a two dimensional array of graphics fragments;

passing one or more graphics fragments having the same positions as the fragments in the stored two dimensional array of fragments down the rendering pipeline; and comparing fragment data of the fragments passed down the rendering pipeline with fragment data stored for the fragments in the corresponding fragment positions in the stored two dimensional array of graphics fragments.

According to a sixth aspect of the present invention, there is provided a 3D graphics processing rendering pipeline, comprising:

means for storing at the end of the pipeline a set of fragment data for a two dimensional array of graphics fragments;

means for passing one or more graphics fragments having the same positions as the fragments in the stored two dimensional array of fragments down the rendering pipeline; and means for comparing fragment data of the fragments passed down the rendering pipeline with fragment data stored for the fragments in the corresponding fragment positions in the stored two dimensional array of graphics fragments.

According to a seventh aspect of the present invention, there is provided a method of comparing data, comprising:

using a 3D graphics processing rendering pipeline to carry out the data comparison.

According to an eighth aspect of the present invention, there is provided a method of comparing blocks of data, comprising:

using a 3D graphics processing rendering pipeline to compare the data blocks.

Which set of fragment data is stored (e.g. at the end of the rendering pipeline, where the rendering module has a pipelined architecture) and which set is subsequently provided by rendering graphics fragments (e.g. by passing fragments down the pipeline) can be selected as desired. However, where it is the case that one set of fragment data is to be compared with plural other sets of fragment data, it is preferred that the set of fragment data that is to remain the same is stored in the rendering module (e.g. at the end of the rendering pipeline). This would be the case in motion estimation operations, where an area of the current video frame is, as discussed above, compared with plural different areas in the reference frame to find the closest match. Thus, in a particularly preferred such embodiment, the data for the block of the video frame currently being encoded is placed in the memory unit of or accessible to the rendering module (e.g. at the end of the rendering pipeline) and then fragment data representing successive sets of pixel blocks from the reference video frame is rendered (e.g. passed down the rendering pipeline) and compared with the data stored for the current frame block until all the desired reference frame blocks have been tried.

In such an arrangement, where fragment data to be compared with plural other sets of fragment data is being stored for use by the rendering module, it is preferred that the new fragment data that is rendered and compared with the stored fragment data is not then written over the stored data (as might, as discussed above, occur in normal operation of a rendering pipeline where conflicting data for the same fragment position is generated), so as to leave that stored data free for comparison with further new sets of fragment data (representing, e.g., different areas of the reference frame).

The graphics fragment data to be compared that is to be stored for use by the rendering module (e.g. at the end of the rendering pipeline) can be so stored as desired. It should be stored in a memory unit of or that is accessible to the rendering module. It is preferably stored in a memory unit of the rendering module, and most preferably in a local memory unit that is more rapidly accessible by the rendering module.

Thus, for example, where the rendering module already includes a memory buffer for storing fragment data (such as one or more tile-buffers in the case of a tile-based rendering system, one or more frame buffers, or a cache memory or memories for temporarily storing fragment data in an immediate mode rendering system) then the fragment data is preferably stored in that memory buffer. Otherwise an additional memory component (or means for accessing memory available elsewhere to the 3D graphics processor) could be added to the rendering module, if necessary.

The fragment data stored in the memory of or accessible to the rendering module can be loaded therein by, e.g., passing that data appropriately through the rendering module (e.g. down the rendering pipeline) first of all. This could be done, e.g., by defining a 3D graphics primitive corresponding to the fragment block to be compared (e.g. a 16×16 fragment block (which would then equate to a 16×16 pixel block) in the case of MPEG video compression motion estimation), setting the fragment data for that primitive accordingly, and then setting the rendering module to a state that effectively passes that fragment data to the memory such that it is stored in the memory with the desired values (e.g. unchanged where the initial fragment data corresponds to the final desired values).

However, in a particularly preferred embodiment, means are provided to allow the fragment data to be stored in the memory of or accessible to the rendering module (e.g. at the end of the rendering pipeline) directly (i.e. without the need for it first to pass through the rendering module (e.g. down the rendering pipeline)). This could be done, e.g., by the system fetching the fragment data directly from external memory and loading it directly into the appropriate memory buffer. This arrangement is advantageous because it avoids the need for the data to pass through the rendering module first, which, accordingly, can, e.g., simplify and accelerate the process. Accordingly, where this facility does not already exist in the rendering module architecture, then appropriate hardware and a circuit are preferably added to and/or associated with the rendering module to permit direct loading of an, e.g. buffer, memory with fragment data values without the need for the data values to go through the whole rendering module.

The second set of fragment data for comparison with the stored fragment data by the rendering module is provided, as discussed above, by rendering appropriate graphics fragments. This rendering process should accordingly be such that the rendered graphics fragments acquire and/or have the desired data values for comparison when they reach the comparison stage, but otherwise can be carried out as desired.

In a particularly preferred embodiment, this is done by effectively passing the graphics fragments through the rendering module (e.g. down the rendering pipeline) in the way that they normally would when carrying out 3D graphics rendering, but with the initial fragment data and the rendering module set such that the fragments have the appropriate data values for comparison once they have been rendered.

In a particularly preferred such embodiment, the fragments to be rendered to provide the set of fragment data for comparison are generated by defining a 3D graphics primitive corresponding to the fragment block (e.g. area of the appropriate video frame, such as a 16×16 pixel block for MPEG video compression motion estimation as discussed above)) that is to be compared, and then passing that primitive (i.e. the fragments representing it) through the rendering module (e.g. down the 3D graphics rendering pipeline where the rendering module is in that form) in such a way that the fragments generated for the primitive have, when they have been rendered (e.g. reach the end of the pipeline), the relevant data values for comparison with the corresponding data values stored for the fragments in the corresponding positions in the memory of (or accessible to) the rendering module.

The primitive that is defined for this purpose should accordingly be defined such that when it is rastered to generate the graphics fragments (e.g. in a rastering stage of the rendering module) it will be rastered to fragments having fragment positions corresponding to the positions of the fragments in the stored fragments array with which it is desired to compare the fragments of the primitive. Thus, where, for example, motion estimation comparison is being carried out over 16×16 blocks of pixels, the system preferably generates a 16×16 fragment primitive that is then passed through the rendering module and the data for the fragments in it compared with a stored 16×16 fragment array.

The (remaining) stages of the rendering module should also, accordingly, be set to operate so as to allocate the appropriate data values for comparison to each rastered fragment. This could be achieved, e.g., by defining the primitive in such a way (e.g. by setting its vertex data in such a way), and setting the rendering module to such a rendering state, that the rendering operations act to allocate the appropriate data to each fragment as it passes through the rendering module. For example, the initial data set for the primitive could be set to correspond to the desired data values for comparison, with the rendering module then being set to a rendering state such that the initial data set for each fragment passing through the rendering module is unchanged by the rendering process.

However, in a particularly preferred embodiment, the fragment data for the fragments passing through the rendering module (i.e. being rendered for comparison with the stored set of fragment data) is generated for those fragments by writing it as a texture map that is then applied appropriately to the fragments as they pass through the rendering module. The rendering module should, if necessary, be set to a state that allows the data values set by the texture map to pass through the rest of the rendering module (e.g. rendering pipeline) unchanged. (As is known in the art, some 3D graphics processing rendering systems allow for the use of so-called "texture maps", in which a plurality of texture element (or "texel") (s, t) coordinate positions are allocated particular texture values. Graphics fragments passing through the renderer are then matched to the texel or texels having the (s, t) position or positions closest to or matching the texture coordinate (s, t) values allocated to each fragment (which texture coordinates can be allocated to each fragment elsewhere in the rendering process, e.g. when the primitive being rendered is first defined) and textured accordingly (i.e. their data values modified or set according to the values of the appropriate texel or texels).)

The Applicants have recognised that by using a texture map having texels which have been allocated the appropriate data values for comparison (e.g. luminance values for video compression motion estimation) and then defining each fragment in the fragment array being processed such that it is operated on by the texel having the data value desired for that fragment position (e.g. by setting the texture coordinates for that fragment to those of the desired texel) (e.g., and preferably, such that for each fragment there is a corresponding single texel), that provides a convenient and efficient mechanism for allocating the appropriate fragment data values to each fragment position for comparison.

Furthermore, where a given stored set of fragment data is to be compared with plural other sets of fragment data (as would, as discussed above, be the case in motion estimation operations) each of the plural comparison sets of fragment data could be defined as a different texture map, with the different texture maps then being applied to the appropriate fragment positions one after another until they have all been compared with the stored fragment data. In such an arrangement, each texture map should, accordingly, cover the same array of fragment (i.e. texel) positions, but will provide a different set of data for those positions (i.e. the data values of the texels in each map will differ for the full set of texel positions (although individual texel positions may of course, have the same data values in different texture maps).

In an alternative such arrangement, a single texture map could be defined and the different sets of fragment data for comparison generated (i.e. allocated to the appropriate fragment positions) by allocating each set of fragments being rendered for comparison (e.g. each different primitive being rendered) a different set of texture coordinates (i.e. such that each set of fragments being rendered picks up a different set of texel positions (and therefore data values) from the texture map).

Thus using texture maps to generate the fragment data values for comparison is a particularly convenient way of handling multiple fragment data set comparisons.

Indeed, it is accordingly strongly preferred, where the rendering module does not already include such a unit, to add to the rendering module a unit that can carry out "texture mapping" operations as described above to allow the data comparison to take place. Such a unit could be (and preferably is) a texture mapper or texturing unit for applying textures to graphics fragments passing through on the rendering module that can then be used in the above manner, but could also, e.g., if desired, be a less complex unit that can operate as described above, but which may not necessarily be able to carry out the full or possible range of "normal" 3D graphics texture mapping operations.

In these arrangements, the necessary fragment data should be written as a texture map or maps which can then be accessed by the texture mapping unit of the rendering module and applied to the fragments passing through the rendering module in the normal manner.

Thus, in a particularly preferred embodiment, the set of data values for comparison with the stored fragment data values are stored as a texture map or maps accessible to and usable by the rendering module, and the graphics fragments being rendered for comparison with the stored fragment array are allocated texture coordinate values such that they will acquire the appropriate data values from the stored texture map or maps as they are rendered. In this arrangement, each fragment is preferably matched to a single texel in a texture map, as that simplifies the process.

Where the texture mapping unit of the rendering module includes a local texture cache (as would typically be the case) then it is preferred that recently accessed texture map data is stored in that cache, so as to reduce the need for accesses to texture map data stored outside the rendering module itself. This is particularly advantageous where, for example, plural overlapping fragment blocks are to be compared with the same stored fragment block, such as might be the case for motion estimation operations (since in such operations over 16×16 pixel blocks, one step of a 16×16 block only changes 16 of 256 pixel values from the previous comparison), since it facilitates efficient reuse of already prepared texture map (texel) data, without the need, e.g., to fetch that data once again from outside the rendering module.

Indeed, it is accordingly preferred in general to locally cache, where possible, any data, such as texture map (texel) data, that is expected to be reused in the comparison process. This could comprise, e.g., simply caching as much of the most recently used data (e.g. texture map, texel, data) as possible (e.g. on a first-in, first out basis up to the size of the cache memory). Alternatively, more sophisticated data caching selection procedures could be used, if desired.

The actual data comparisons can be carried out by any suitable means for so doing. In a particularly preferred embodiment, a data comparison unit or units that takes as its input data in the stored fragment array and data of rendered fragments and compares that data in the desired manner is added to the rendering module (e.g. pipeline) at an appropriate point for this purpose.

Alternatively, where the rendering module already includes a unit or units that can be used (or can be modified to be used) for the comparison operation, then those units could be used (with any necessary modifications to their operation) instead, if desired. For example, as is known in the art, blending units of 3D graphics rendering modules typically take as inputs (colour) data of stored graphics fragments and data from rendered fragments and "blend" that data (e.g. by averaging it) to provide an output colour value for that fragment position. The Applicants have recognised that it would accordingly be possible to use a blending unit of an existing 3D graphics processing system to (with appropriate modification, if necessary) carry out the data comparison operations, and, indeed, in another preferred embodiment of the invention, a blending unit of the 3D graphics rendering module is used to carry out the data comparison(s).

While it would be possible to use the rendering pipeline in the manner discussed above to compare data for a single fragment position only, as discussed above, and as will be appreciated by those skilled in the art, more typically the process will be used to compare blocks of data (i.e. two dimensional arrays of fragment data). This would, e.g., be the case when comparing blocks of pixels in different video frames for motion estimation. Where the data for plural fragment positions is being compared in this way, then it will, as will be appreciated by those skilled in the art, be necessary to accumulate the results of the comparisons for each individual fragment position to obtain an overall comparison result for the complete fragment array, e.g. data (e.g. pixel) block. Thus in a particularly preferred embodiment, comparisons of the data are carried out for a plurality of fragment positions and the results accumulated to give an overall comparison measure for all the fragment positions taken together. If necessary suitable accumulating means can be added to and/or associated with the rendering module to achieve this.

The actual form that the data values to be compared for each fragment position are stored and handled in can be selected as desired, although this should be done such that the data values can be operated on as appropriate by the rendering module. Most preferably the source data values for comparison are stored (in an appropriate form; they could be, e.g., modified in software to achieve this if necessary) in one (or more) of the data value register or registers used for each fragment by the rendering module. Thus, most preferably the data values are stored in one or more of the red, green, and blue (and alpha, if provided) channels of each fragment. This is particularly convenient, as this is the format that the rendering module will normally handle data in.

The fragment data can be compared in any desired manner. Preferably, each pair of fragment data for each fragment "position" is compared with each other. Most preferably the error or difference between the data values being compared is determined. Where appropriate, the comparison results determined for each individual fragment position are preferably then accumulated over all the desired fragment positions, as discussed above.

Known data comparison or cost function techniques such as mean absolute difference (MAD), sum of absolute differences (SAD) or mean-squared difference (MSD) functions across all the fragment positions being considered could, for example, be used. In a preferred embodiment a sum of absolute differences function is used for the comparison, since that is similar to a mean-squared difference function (which is known to give good results) but adds the absolute values of the data differences, rather than accumulating the squared differences. Such an addition operation is more straightforward to implement in hardware than the multiplication necessary to carry out squaring operations.

Furthermore, where a mean-type of cost function is to be used, it is preferred only to implement a sum-type of cost function in the hardware of (or added to) the rendering module, and to carry out any subsequent averaging (i.e. obtaining of the mean) in software (e.g. external to the rendering module), as that simplifies the operation where, e.g., a different number of fragment positions could or is likely to be used for comparisons of different data blocks (since the number of fragment positions (i.e. individual compares) determines the number that the sum function has to be divided by to get the mean value).

The "original" or source data that is to be compared (i.e. the data that is to be allocated as fragment data so that it can be compared) can be any suitable such data (i.e. data that can be processed appropriately as fragment data in a 3D graphics rendering module). The actual data to be compared will, as will be appreciated by those skilled in the art depend upon the source data that is to be considered. In the case of motion estimation functions, for example, the original video data to be compared will typically be provided as luminance (Y) and chrominance (U, V) values for the pixels in each video frame, as is known in the art. In that case, preferably the luminance values are compared (as is typically done for motion estimation), i.e. are used for the fragment data, although as will be explained further below, the present invention also facilitates the comparison of chrominance as well as luminance values, if desired.

Thus where, for example, motion estimation is being carried out, the luminance values for comparison could, for example, be stored in the red "channel" of each fragment, with the red channel data values for each corresponding fragment position then being compared. The green, blue and alpha channels would be unused.

However, the Applicants have recognised that the ability of a 3D graphics rendering module to store and handle plural, e.g., four, data values (channels) for each fragment position can be used to further enhance the data comparison process. In particular, the ability of a single fragment to carry plural data values would allow a single fragment passing down the rendering pipeline to be used to carry out "compares" of plural data values in the source data in one go. This could be done by, e.g., comparing the data value in one channel (e.g. the red channel) of a fragment with the data value in that channel of another fragment, and, e.g. simultaneously or successively, comparing the data values in a different channel (e.g. the green channels) of the fragments being compared and so on (up to the maximum number of data channels for each fragment). This could be used, e.g., to further enhance the comparison process.

For example, where it might be desirable to compare more than one data value in the original (source) data for each "position" in the source data, plural such data values for a given source data "position" could be stored for each fragment by using more than one of the plural data channels available for each fragment position. Thus, for example, in the case of video motion estimation, as well as storing the luminance value for an individual pixel in the video frame block in the red channel of a given fragment, the chrominance values for that pixel could also be stored in that fragment using the, e.g., green and blue channels of that fragment (and accordingly compared), thereby allowing chrominance as well as luminance comparisons to be made. This would allow, for example, more precise motion estimation comparisons that take account of more of the original video data.

Alternatively or additionally, the plural data channels available for each fragment in the rendering module could be used to store (and accordingly compare) data for more than one given "position" in the original (source) data. For example, when carrying out motion estimation, a single fragment could be used to, e.g., store luminance values for (up to) four different pixel positions in the original video data, by storing each different luminance value in its red, green, blue and alpha channels, respectively. By then comparing separately the data in the red channels of each fragment, the data in the green channels of each fragment, and so on, the luminance values of four pixels in the original video data could be compared using only a single fragment comparison operation in the rendering module. This would, accordingly, accelerate the motion estimation process.

Thus, in a particularly preferred embodiment, the rendering module is arranged such that each given fragment whose data values are to be compared can be (and preferably is) used to compare plural different data values from the original (source) data. This could be, e.g., as discussed above, different data types for the same data "position" in the source data (e.g. luminance and chrominance values for a given pixel position in motion estimation for video encoding), or data of the same type but for different data "positions" in the source data (e.g. luminance values for more than one pixel position in a given block of a video frame in motion estimation for video encoding).

In a similar manner, where the rendering module provides the facility to handle multiple "sub-fragments" for a given fragment passing through the module (e.g. where the module treats each fragment as a number of sub-fragments, each of which sub-fragments carry their own red, green, blue and alpha values), then again these parallel resources are preferably exploited along the lines discussed above to further enhance and accelerate the comparison process, by, e.g., in a similar manner to the above, using each sub-fragment to store and process different data from the source data (rather than simply leaving any additional sub-fragments "empty"). For example, where the rendering module operates on four sub-fragments per "fragment", this could be used to quadruple the processing speed.

Thus it is preferred to process the original data in parallel where, and as far as, this is possible, and any hardware added to the rendering module to, e.g., carry out and accumulate the comparison functions should be designed to carry out such parallel processing where desired.

As will be appreciated from the above, in operation of the rendering module to carry out data comparisons in accordance with the present invention, it will need to be provided with the original data it is to compare in an appropriate form. This data is preferably prepared by a software application that is, for example, external to the rendering module (and preferably, the graphics processor), and running on, e.g., a host microprocessor that can access and control the 3D graphics processor.

Once the data is prepared, the software application should provide it to the rendering module in an appropriate form and/or control the rendering module to access that data in an appropriate form. In the case of motion estimation operations for video encoding, this process could entail, for example, extracting the luminance values for comparison from the source video data and then providing those values to the rendering module for comparison and/or instructing the rendering module to retrieve the extracted values from a memory unit where they are stored (where, e.g., the rendering module can act as a "bus master").

In a particularly preferred embodiment of the present invention, these operations involve, as discussed above, the software application causing one set of original data for comparison to be loaded into the fragment data channels in a buffer memory of the rendering module (e.g. at the end of the rendering pipeline, where the rendering module is in a pipelined form), and causing other sets of original data for comparison therewith to be loaded as a texture map or maps in a memory accessible to the texture mapping unit or units of the rendering module (e.g. the local texture cache and/or some other memory accessible to that unit). This could be done, e.g., either by the software application sending that data in its original form appropriately to the rendering module (where, e.g., the rendering module acts as a "bus slave"), or by the software application providing the rendering module with an indication of the memory locations where that data is stored, in which case the rendering module would then itself retrieve and then load that data in its local memory units. This latter arrangement could be used where the rendering module can act as a bus master, if desired.

The software application would also set the rendering module to the appropriate rendering state for the comparison operation and instruct the rendering module to process fragments such that they pick up the appropriate data from the texture mapping stage to allow the desired data comparisons to take place.

Thus, according to a ninth aspect of the present invention, there is provided a method of operating a microprocessor in a microprocessor system comprising a 3D graphics processor and a microprocessor that can control the 3D graphics processor, the method comprising:

the microprocessor selecting sets of data for comparison;

the microprocessor causing one of the selected sets of data to be stored as a graphics fragments array in a memory unit of or accessible to the 3D graphics rendering module;

the microprocessor causing the other selected set or sets of data to be stored as texture map values in a memory unit accessible to a texture mapping unit of the 3D graphics rendering module; and the microprocessor controlling the 3D graphics rendering module to render a 3D graphics primitive such that the fragments of the primitive acquire desired data values from the stored texture map values as they are rendered, and such that the 3D graphics rendering module then compares the rendered primitive fragment data values with the stored data values in the memory unit of or accessible to the 3D graphics rendering module.

According to a tenth aspect of the present invention, there is provided an apparatus for controlling the operation of a 3D graphics rendering module, the apparatus comprising:

means for selecting sets of data for comparison;

means for causing one of the selected sets of data to be stored as a graphics fragments array in a memory unit of or accessible to the 3D graphics rendering module;

means for causing the other selected set or sets of data to be stored as texture map values in a memory unit accessible to a texture mapping unit of the 3D graphics rendering module;

means for causing the 3D graphics rendering module to render a 3D graphics primitive such that the fragments of the primitive acquire desired data values from the stored texture map values as they are rendered, and to then compare the rendered primitive fragment data values with the stored data values in the memory unit of or accessible to the 3D graphics rendering module.

As will be appreciated from the above, the memory unit of or accessible to the rendering module in which the fragment array is stored will typically be (and preferably is) a local buffer memory of the rendering module (and will typically be and preferably is, such a buffer memory at the end of the rendering pipeline where the rendering module has a pipelined architecture).

In a particularly preferred embodiment of these aspects and embodiments of the invention, the rendering module is arranged to allocate the appropriate data values to the fragments it renders by the controlling software (microprocessor) instructing the rendering module to render a primitive (e.g. in the form of a square) having primitive data values (e.g. texture coordinate values) set such that the fragments used to render the primitive will pick up the appropriate data values from the texture mapping process. The primitive to be rendered should correspond to the shape and size and fragment positions of the stored fragment array with which the primitive fragment data values are to be compared (or at least that part of the stored fragment array over which it is desired to compare the fragment data values).

In response to such instructions, the rendering module (or at least the 3D graphics processor) would accordingly first rasterise the primitive to generate a set of fragments having positions (i.e. (x, y) coordinates) corresponding to the positions that the primitive is set to cover (which will be such that the fragment positions rastered for the primitive match the fragment positions of the stored fragment array). The so-generated fragments will then each be allocated the appropriate texture coordinates as again defined by the initial primitive data. The rendering module will then render the fragments, such that each fragment picks up the texel value or values corresponding to its allocated texture coordinates from the stored texture map or maps. Finally, the rendering module will compare the data values of the rendered graphics fragments with the data values stored for the corresponding fragment positions in the stored fragment array.

As will be appreciated from the above, in a particularly preferred embodiment of these aspects and embodiments of the invention, plural sets of data values for comparison will be stored for application to graphics fragments by the texture mapping process (e.g. as a plurality of texture maps or a single, larger texture map) and the 3D graphics rendering module will be controlled to render plural primitives in succession, with each primitive being arranged to pick up a different set of data values for comparison when it is rendered.

Once the rendering module has carried out the comparison for all the fragment positions of a given primitive, and accumulated the result, it preferably exports the accumulated result to, e.g., external memory, where it can then be retrieved by the appropriate software application for analysis and any decision that needs to be made based on the comparison results.

Most preferably the rendering module is arranged such that it can store the results of plural data set comparisons (i.e. for plural different primitives) before it has to export them to the controlling application, as this makes it possible for the controlling application to set up a longer list of comparisons to make and then collect a list of results once all the comparisons have been made, rather than having to set up each comparison and collect the results one at a time. Where the rendering module has this facility, the controlling software can, e.g., load at the start of the comparison process sufficient data for all the different sets of data it wishes to compare (e.g. as a texture map or maps) and then instruct the rendering module to render a number of primitives in succession, with each primitive corresponding to one of the comparisons that it is desired to make.

To facilitate such operation, the rendering module is preferably provided at its end with plural error registers that are each used to accumulate and store the comparison results for a given set of data comparisons (i.e., primitive). Each primitive to be "rendered" is accordingly allocated an error register when it is first started to be "rendered", which error register is then retained for that primitive until its full comparison result has been accumulated and exported. Preferably, the fragments for a given primitive entering and passing through the rendering module are monitored so that it can be determined when the last fragment has been processed (i.e. the comparison for that primitive has finished), thereby indicating that the register value is ready to be exported, e.g., back to the controlling software.

In such arrangements, the final register values for export are preferably exported for a plurality of registers simultaneously (e.g. for all of the registers or a predetermined number of them), rather than one at a time, for convenience. Thus the system preferably waits until a given number of registers contain their final values before exporting them.

It is also preferred in such arrangements, for the "rendering" of a new primitive not to be started unless (and until) there is a register free for accumulating and storing the results of the comparison for that primitive.

The comparison result data exported by the rendering module should comprise the final comparison result (e.g. cumulative error value), together with, where appropriate, an identifier for indicating which comparison the result relates to.

As can be seen from the above, it is preferred in arrangements of the present invention that the 3D graphics rendering module effectively simply acts as a "slave" that is provided with data to compare, carries out the comparison and then exports the comparison result for analysis elsewhere. When using such an arrangement for motion estimation, for example, the controlling software application would accordingly determine the data to be compared (i.e., the current frame/block reference frame and motion vectors to try), load the current frame block data to the memory of the rendering module, load the reference frame data as texture map data for the rendering module, and then control the rendering module to, e.g., render successive, square primitives having texture coordinates that will cause the fragments of the primitive to be allocated the texture data from the stored texture maps corresponding to the motion estimation vectors to be tried. The rendering module would then process each primitive and the data indicated by the texture coordinates provided to compare and accumulate the result and then export the result back to the controlling software (or another application) to allow that software to make the relevant motion estimation decision, e.g., as to whether the frame blocks are a sufficiently close match.

The present invention can be used to compare any desired data, and is, as will be appreciated from the above, particularly applicable to the comparison of two-dimensional arrays of data. It is accordingly particularly suited to application with differential encoding techniques, where comparisons of different data sets is required.

It could also be used, for example, for 2-dimensional pattern recognition, particularly where a single input pattern is to be compared with plural reference patterns. An example of such an application would be retina pattern matching. Other applications of these aspects of the present invention would be, for example, text recognition (such as recognising and translating from a bitmap representation of text to a character representation of the text), and scanning applications such as detecting actual motion from one frame to the next by combining plural input images of a given target from a moving camera into one image (by determining the differences between each of the images).

As discussed above, the present invention is particularly applicable to the comparison operations necessary for motion estimation in video encoding. In such a case, the sets of data being compared will be data for 2-dimensional blocks of pixels in different frames of the source video data, such as 16×16 pixel blocks in the case of MPEG video encoding.

Thus, according to an eleventh aspect of the present invention, there is provided a method of performing motion estimation for differential video encoding, comprising:

using a 3D graphics processing rendering module to compare blocks of data in different video frames.

According to a twelfth aspect of the present invention, there is provided a method of performing motion estimation for differential video encoding, comprising:

storing in a memory unit of or accessible to a 3D graphics rendering module a set of graphics fragment data representing video data for a pixel block from a frame of the video data;

rendering using the 3D graphics rendering module one or more graphics fragments having the same positions as the fragments in the stored two dimensional array of fragments such that they acquire fragment data representing video data for a pixel block from another frame of the video data; and comparing the fragment data of the rendered fragments with the fragment data stored for the fragments in the corresponding fragment positions in the stored two dimensional array of graphics fragments.

According to a thirteenth aspect of the present invention, there is provided a method of operating a microprocessor in a microprocessor system comprising a 3D graphics processor and a microprocessor that can control the 3D graphics processor, the method comprising:

the microprocessor selecting blocks of pixel data from two or more video frames of a video sequence for comparison;

the microprocessor causing one of the selected pixel data blocks to be stored as a graphics fragments array in a memory unit of or accessible to the 3D graphics rendering module;

the microprocessor causing the other selected pixel data block or blocks to be stored as texture map values in a memory unit accessible to a texture mapping unit of the 3D graphics rendering module;

the microprocessor controlling the 3D graphics rendering module to render a 3D graphics primitive such that the fragments of the primitive acquire desired pixel data values from the stored texture map values as they are rendered, and such that the 3D graphics rendering module then compares the rendered primitive fragment data values with the stored data values in the memory unit of or accessible to the 3D graphics rendering module.

According to a fourteenth aspect of the present invention, there is provided an apparatus for controlling the operation of a 3D graphics rendering module, the apparatus comprising:

means for selecting blocks of pixel data from two or more video frames of a video sequence for comparison;

means for causing one of the selected blocks of pixel data to be stored as a graphics fragments array in a memory unit of or accessible to the 3D graphics rendering module;

means for causing the other selected pixel data block or blocks to be stored as texture map values in a memory unit accessible to a texture mapping unit of the 3D graphics rendering module;

means for causing the 3D graphics rendering module to render a 3D graphics primitive such that the fragments of the primitive acquire desired pixel data values from the stored texture map values as they are rendered, and to then compare the rendered primitive fragment data values with the stored data values in the memory unit of or accessible to the 3D graphics rendering module.

As will be appreciated by those skilled in the art, in these aspects and embodiments of the invention can include any one or more or all of the preferred and optional features of the invention described herein. Thus, for example, the data being compared will typically be the luminance value of the video data for each pixel in the pixel block, although, as discussed above, chrominance values could be used as well. Preferably, as discussed above, the data for the pixel block in the current video frame being encoded is stored in a memory buffer at the end of a rendering pipeline, and the data from the reference (prediction) frame block or blocks is generated by rendering graphics fragments such that they acquire that data, preferably by storing it as texture map data.

As will be appreciated from the above, the present invention basically facilitates efficient, hardware-based data comparison for, e.g., 2-dimensional blocks of data by, in its preferred embodiments at least, using a comparison (e.g. cost or difference function) circuit in a 3D graphics rendering module (e.g. pipeline) to calculate, e.g., the accumulated cost (difference) between existing fragment data values in a memory buffer of the rendering module and data values of subsequently rendered graphics fragments.

Thus, according to a fifteenth aspect of the present invention, there is provided a 3D graphics rendering module, comprising:

means for comparing fragment data values stored in a memory unit of or accessible to the rendering module with data values of rendered graphics fragments.

According to a sixteenth aspect of the present invention, there is provided a method of operating a 3D graphics rendering module, comprising:

comparing fragment data values stored in a memory unit of or accessible to the rendering module with data values of rendered graphics fragments.

Again, these aspects of the invention can include any one or more or all of the preferred and optional features of the invention described herein. Thus, for example, the comparison operation preferably comprises accumulating the differences between the data values for a plurality of fragment data value comparisons. It will be further appreciated that in the latter type of arrangement, the rendering module will, as discussed above, preferably comprise some form of accumulation unit for accumulating the determined data difference values for the plurality of fragment data value comparisons.

Thus, according to a seventeenth aspect of the present invention, there is provided a 3D graphics rendering module, comprising:

means for accumulating the results of operations using fragment data values stored in a memory unit of or accessible to the rendering module and data values of rendered graphics fragments.

According to an eighteenth aspect of the present invention, there is provided a method of operating a 3D graphics rendering module, comprising:

accumulating the results of operations using fragment data values stored in a memory unit of or accessible to the rendering module and data values of rendered graphics fragments.

Again, these aspects of the invention can include any one or more or all of the preferred and optional features of the invention described herein. Thus, they preferably comprise means for or a step of accumulating plural comparisons of fragment data values stored in a memory unit of or accessible to the rendering module with data values of rendered graphics fragments. They could also, or instead, include, for example, accumulating plural additions of such data values.

Although the present invention has been described above with particular reference to comparing sets of data values across a two-dimensional array of "data positions" (and accordingly with particular reference to motion estimation operations for video encoding), the Applicants have recognised that the ability, as discussed above, to provide using a 3D graphics processor a stored set of data for, e.g., an array of fragment positions, and a second set of data for those fragment positions by "rendering" that data also facilitates (and can be used, e.g., to hardware accelerate) other data processing and handling operations, in particular where it is necessary to operate on plural sets of two-dimensional arrays of data.

For example, rather than accumulating the overall difference value across the array of fragment positions being compared as discussed above, the arrangement of the present invention could be used (with appropriate modification, if necessary) to determine and store the differences between the data values being compared for each fragment (x, y) position (and data channel, where appropriate) individually, i.e. such that a two-dimensional array of individual data difference values is obtained.

Such an arrangement could be used, e.g., in video encoding to determine the video data difference values between the current frame block and the selected reference frame block for each pixel position that are to be encoded along with the determined motion vector for transmission of the video data. This could be done, e.g., by loading (as discussed above) the data values for the current frame into the memory unit of or accessible to the rendering module, and then controlling the rendering module to render fragments such that they acquire pixel data corresponding to the determined reference frame to be used for the motion estimation process, and then subtracting the data values of the rendered fragments at each fragment position (and data channel) from the corresponding stored value, to give a two-dimensional array of difference values that would then be encoded as representing the difference between the pixel data values for the current frame block and the pixel data values for the reference frame block.

It would similarly be possible to use the present invention to add individual pairs of data values across the array of fragment positions (and data channels, where appropriate), such that a modified two-dimensional array of data values if obtained. This type of operation could be used for the decoding (frame block reconstruction) process of video decoding motion compensation by, e.g., storing the array of frame difference values in the memory unit of or accessible to the rendering module, rendering fragments such that they acquire the reference frame data values, and then adding the stored and "rendered" data values for each corresponding fragment position (and data channel) to thereby reconstruct the data values for the current frame block.

Thus, in a particularly preferred embodiment, the present invention also includes a step of or means for determining a set of output data values for an array of fragment positions from a set of data values stored for the array of fragment positions in a memory unit of or accessible to the rendering module and a set of data values for those fragment positions provided by rendering graphics fragments having the relevant fragment positions. In this embodiment, the output set of data values are preferably, as discussed above, determined by subtracting the stored data value from the "rendered" data value for each fragment position (or vice-versa), or by adding the two values together. However, other mathematical operations such as multiplication, division, or more complex mathematical functions would be possible if desired.

It is believed that these arrangements may be new and advantageous in their own right. Thus, according to a ninteenth aspect of the present invention, there is provided a method of operating a 3D graphics rendering module of a 3D graphics processing system, comprising:

storing in a memory unit of or accessible to the 3D graphics rendering module a set of fragment data for a two dimensional array of graphics fragments;

using the 3D graphics rendering module to render one or more graphics fragments having the same positions as the fragments in the stored two dimensional array of fragments to generate fragment data for those fragments; and determining an output two dimensional array of data by modifying the fragment data stored for each fragment position in the stored two dimensional array of graphics fragments using fragment data of rendered fragments having the corresponding fragment positions.

According to a twentieth aspect of the present invention, there is provided a 3D graphics processing rendering module, comprising:

means for storing a set of fragment data for a two dimensional array of graphics fragments;

means for rendering one or more graphics fragments having the same positions as the fragments in the stored two dimensional array of fragments to generate fragment data for those fragments; and means for determining an output two dimensional array of data by modifying the fragment data stored for each fragment position in the stored two dimensional array of graphics fragments using fragment data of rendered fragments having the corresponding fragment positions.

Thus, according to a twenty-first aspect of the present invention, there is provided a method of operating a 3D graphics rendering pipeline of a 3D graphics processing system, comprising:

storing at the end of a 3D graphics rendering pipeline a set of fragment data for a two dimensional array of graphics fragments; passing one or more graphics fragments having the same positions as the fragments in the stored two dimensional array of fragments down the rendering pipeline; and determining an output two dimensional array of data by modifying the fragment data stored for each fragment position in the stored two dimensional array of graphics fragments using fragment data of fragments passed down the rendering pipeline and having the corresponding fragment positions.

According to a twenty-second aspect of the present invention, there is provided a 3D graphics processing rendering pipeline, comprising:

means for storing at the end of the pipeline a set of fragment data for a two dimensional array of graphics fragments;

means for passing one or more graphics fragments having the same positions as the fragments in the stored two dimensional array of fragments down the rendering pipeline; and means for determining an output two dimensional array of data by modifying the fragment data stored for each fragment position in the stored two dimensional array of graphics fragments using fragment data of fragments passed down the rendering pipeline and having the corresponding fragment positions.

As will be appreciated by those skilled in the art, these aspects and arrangements of the present invention can include any one or more or all of the preferred and optional features of the present invention described herein.

In these aspects and embodiments of the invention, the way that the stored array of fragment data is modified using the "rendered" fragment data can be selected as desired. As discussed above, it is particularly preferred for the rendered fragment data value for a given fragment position to be subtracted from, or added to, the stored data value for that fragment position (or vice-versa), i.e. such that the (final) output data value for a given fragment position is the difference between the rendered and stored data values (or vice-versa), or the sum of the rendered and stored data values, although other arrangements would be possible if desired.

Preferably the data value for each fragment position in the stored array is modified (although this is not essential). This is most preferably done by rendering a single fragment for each position in the stored fragment array.

Which set of data is stored and which set is subsequently rendered to modify the stored data can, as discussed above in relation to data comparison operations, be selected as desired. The data sets can similarly be prepared and stored or provided to the rendered fragments as desired. Thus, for example, it is preferred to directly load one set of data into the memory unit of or accessible to the rendering module, and for the "rendered" set of data to be provided by storing that data as a texture map or maps and then controlling the rendering module to render an appropriate graphics primitive.

The data modification can be carried out by any suitable means for so doing. Thus, for example, in one preferred embodiment, an appropriate addition and/or subtraction unit is added to the rendering module. Alternatively, where the rendering module already includes a unit or units, such as a blending unit, that could (with any necessary modifications) be used for these operations, then that unit could be used instead.

The data values for each fragment position can be, as for the data comparison operations, stored and handled in any appropriate manner. As discussed above, they are preferably stored in a data channel or channels of each fragment position. Most preferably, more than one data channel is used for each fragment position, with the data values in each data channel of the stored fragments being modified separately by the data values in the corresponding data channels for the relevant rendered fragment. It is similarly preferred to use any "sub-fragment" processing ability of the rendering module where that is possible.

In other words, as discussed above in relation to data comparison operations, it is preferred to process the data values in the data sets in parallel, for example, by storing data values to be, e.g., individually added or subtracted, in different data channels of each fragment position, such that, for example, for a single fragment position "addition" operation, the addition of more than one discrete pair of data values can be carried out.

The operation of these aspects and embodiments of the invention can basically be as described above in relation to the use of the rendering module for data comparison operations. Thus, preferably, a software application prepares the data sets to be used, causes that data to be loaded into the memory unit and, e.g., as texture maps for use by the rendering module, and then instructs the rendering module to render an appropriate graphics primitive or primitives to provide the desired output data array.

Thus, according to a twenty-third aspect of the present invention, there is provided a method of operating a microprocessor in a microprocessor system comprising a 3D graphics processor and a microprocessor that can control the 3D graphics processor, the method comprising:

the microprocessor selecting two sets of data to be used to provide a modified set of data;

the microprocessor causing one of the selected sets of data to be stored as a graphics fragments array in a memory unit of or accessible to the 3D graphics rendering module;

the microprocessor causing the other selected set of data to be stored as texture map values in a memory unit accessible to a texture mapping unit of the 3D graphics rendering module; and the microprocessor controlling the 3D graphics rendering module to render a 3D graphics primitive such that the fragments of the primitive acquire desired data values from the stored texture map values as they are rendered, and such that the 3D graphics rendering module then determines an output two dimensional array of data by modifying the fragment data values stored for each fragment position in the stored array of graphics fragments using the fragment data of the rendered primitive fragments having the corresponding fragment positions.

According to a twenty-fourth aspect of the present invention, there is provided an apparatus for controlling the operation of a 3D graphics rendering module, the apparatus comprising:

means for selecting two sets of data to be used to provide a modified set of data;

means for causing one of the selected sets of data to be stored as a graphics fragments array in a memory unit of or accessible to the 3D graphics rendering module;

means for causing the other selected set of data to be stored as texture map values in a memory unit accessible to a texture mapping unit of the 3D graphics rendering module;

means for causing the 3D graphics rendering module to render a 3D graphics primitive such that the fragments of the primitive acquire desired data values from the stored texture map values as they are rendered, and to then determine an output two dimensional array of data by modifying the fragment data values stored for each fragment position in the stored array of graphics fragments using the fragment data of the rendered primitive fragments having the corresponding fragment positions.

These aspects and arrangements of the invention can again include any one or more or all of the preferred features of the invention discussed herein.

The modified data value(s) determined for each fragment position could, e.g., be written over the existing value(s) stored for that fragment position in the memory unit of or accessible to the rendering module (i.e. such that the modified output data array replaces the originally stored data array). Alternatively, the modified data values could be written and stored elsewhere, e.g. in another memory unit of or accessible to the rendering module.

Once the rendering module has carried out the data modifications for all the fragment positions of the data array, the resulting output data array (set) is preferably exported to, e.g., external memory, where it can then be retrieved by the appropriate software application for subsequent use.

These aspects and arrangements of the present invention can be used to perform any desired mathematical operations between sets of data arrays, and are, as will be appreciated from the above, particularly applicable to the addition or subtraction of two-dimensional arrays of data. They are accordingly particularly suited to application with differential encoding and decoding techniques, where the subtraction and addition of different data sets is required.

As discussed above, these aspects and arrangements of the present invention are particularly applicable to the data subtraction and addition operations necessary for differential data encoding and decoding (motion compensation) in video encoding.

In the case of video data encoding, one set of data representing the pixel data values for the reference video frame block is subtracted, pixel-position by pixel-position, from the set of pixel data values for the current frame block of the source video data. These aspects and arrangements of the present invention can be used to do this by loading the pixel data values for the current frame block as a fragment array in the memory unit of or accessible to the rendering module, and then loading the pixel data values for the reference frame block as an appropriate texture map or maps and controlling the rendering module to render a primitive and subtract the "rendered" reference frame pixel data values from the stored fragment array data values, thereby giving an output array comprising the difference values for each fragment position (i.e. pixel position in the pixel block).

Differential video data decoding would be carried out in a similar manner, but in that case, the known pixel data difference values would be added to the pixel data values for the reference frame block to reproduce the current pixel block data values. In this arrangement, the known pixel data difference values for the current frame block are preferably stored in the memory unit of or accessible to the rendering module, with the data values for the reference frame block again being stored as texture map values. The rendering module is then controlled to render a primitive, but in this case to add the "rendered" reference frame pixel data values to the stored fragment array data difference values, thereby giving an output array comprising the (recreated) pixel data values for each pixel position in the current frame block.

Thus, according to a twenty-fifth aspect of the present invention, there is provided a method of performing differential encoding or decoding for differential video encoding, comprising:

using a 3D graphics processing rendering module to add or subtract blocks of data in different video frames.

According to a twenty-sixth aspect of the present invention, there is provided a method of performing differential encoding or decoding for differential video encoding, comprising:

storing in a memory unit of or accessible to a 3D graphics rendering module a set of graphics fragment data representing video data for a pixel block from a frame of the video data;

rendering using the 3D graphics rendering module one or more graphics fragments having the same positions as the fragments in the stored two dimensional array of fragments such that they acquire fragment data representing video data for a pixel block from another frame of the video data; and adding or subtracting the fragment data of the rendered fragments to or from the fragment data stored for the fragments in the corresponding fragment positions in the stored two dimensional array of graphics fragments.

According to a twenty-seventh aspect of the present invention, there is provided a method of operating a microprocessor in a microprocessor system comprising a 3D graphics processor and a microprocessor that can control the 3D graphics processor, the method comprising:

the microprocessor selecting a block of pixel data from each of two video frames of a video sequence;

the microprocessor causing one of the selected pixel data blocks to be stored as a graphics fragments array in a memory unit of or accessible to the 3D graphics rendering module;

the microprocessor causing the other selected pixel data block to be stored as texture map values in a memory unit accessible to a texture mapping unit of the 3D graphics rendering module;

the microprocessor controlling the 3D graphics rendering module to render a 3D graphics primitive such that the fragments of the primitive acquire desired pixel data values from the stored texture map values as they are rendered, and such that the 3D graphics rendering module then adds or subtracts the rendered primitive fragment data values to or from the stored data values in the memory unit of or accessible to the 3D graphics rendering module.

According to a twenty-eighth aspect of the present invention, there is provided an apparatus for controlling the operation of a 3D graphics rendering module, the apparatus comprising:

means for selecting a block of pixel data from each of two video frames of a video sequence;

means for causing one of the selected blocks of pixel data to be stored as a graphics fragments array in a memory unit of or accessible to the 3D graphics rendering module;

means for causing the other selected pixel data block to be stored as texture map values in a memory unit accessible to a texture mapping unit of the 3D graphics rendering module;

means for causing the 3D graphics rendering module to render a 3D graphics primitive such that the fragments of the primitive acquire desired pixel data values from the stored texture map values as they are rendered, and to then add or subtract the rendered primitive fragment data values to or from the stored data values in the memory unit of or accessible to the 3D graphics rendering module.

As will be appreciated by those skilled in the art, in these aspects and embodiments of the invention can include any one or more or all of the preferred and optional features of the invention described herein.

In these aspects and embodiments of the invention, the data being added or subtracted will, as is known in the art, typically be the luminance and chrominance (YUV) values of the video data for each pixel in the pixel blocks, although, where appropriate, other data values could be used instead or as well. The data additions or subtractions could be carried on each data type (i.e. Y, U, V values) separately, one after another, i.e. such that each set of data values for the pixel blocks is stored as a separate texture map and fragment array, and three passes are then needed to carry out the complete pixel data subtraction or addition operation. Alternatively, the YUV values could, e.g., each be stored in different data channels of the same fragments, such that the data can be processed in parallel.

In a particularly preferred arrangement of these aspects and embodiments of the invention, the pixel data for the current frame block (either in the form of the actual pixel data values, or in the form of a set of determined pixel data difference values), and the pixel data for a preceding and for a succeeding reference frame block (preferably for a frame block from the previous frame to the current frame and for a frame block from the next frame after the current frame) are stored as texture map values such that they can then be transferred to the memory unit of or accessible to the rendering module and/or added to or subtracted from pixel data values already stored in that memory unit by the rendering module rendering appropriate primitives.

This type of arrangement facilitates bidirectional motion compensation (where, as is known in the art, a frame block that is based on a combination of, e.g., the previous and next frames, can be used as a reference frame for encoding/decoding the current frame). By storing the plural frame blocks as texture maps, it is possible by appropriately rendering primitives to transfer the texture map data to the memory store and/or to add or subtract it to already stored data, to generate reference frame blocks that are a combination of, e.g., previous and next frame blocks, and then determine (or add) the necessary difference values for the current frame block.

For example, when carrying out such an operation, where the reference frame block is made up of the previous and next frames, the rendering module could first be controlled to render a primitive so as to transfer the data values for the previous frame block to the memory unit of or accessible to the rendering module. The rendering module could then be controlled to render a primitive that will acquire the data values for the next frame from the texture map store and blend those values appropriately with the stored previous frame values to thereby provide a "blended" reference frame block that can be stored in the memory unit of or accessible to the rendering module. The memory unit would then be storing the appropriate "bidirectional" reference frame block and so by then controlling the rendering module to render a primitive such that it has the current frame values, the necessary addition or subtraction of the bidirectional reference frame block can be performed.

Where a "blended" reference frame block is to be derived as discussed above, the necessary mathematical operations are preferably carried out in a blending unit of the rendering module (since the data processing is similar to 3D graphics blending operations), although that is not essential and another unit could be added to the rendering module to carry out this operation if desired.

For example, another way to blend together two reference blocks to form a "blended" reference frame block would be to use appropriate "multi-texturing". As is known in the art, some 3D graphics processors allow a 3D graphics primitive to be assigned multiple textures simultaneously (each with their own texture coordinates) and which can be blended together in different ways to give the final colour for the fragments. This is known as "multi-texturing" and is used, for example, to use one texture map to provide a 3D surface with a basic colour, another texture map to give the surface texture (e.g. bumps, etc.), and another texture map to add, e.g., specular highlights. Where such multi-texturing is supported, and is capable of (or can be modified to be capable of) looking up and blending together all the allocated textures to a primitive before the end of the rendering module (i.e. before the data addition, etc., operation takes place), then a "blended" reference frame can be provided by assigning both the (previous and next) reference frame blocks as texture maps for the primitive to be rendered and carrying out multi-texturing to "blend" the reference frame blocks, such that the rendered primitive then represents the appropriate combination of the two reference frame blocks when the data modifying operation takes place.

As will be appreciated from the above, these aspects and arrangements of the present invention basically facilitate efficient, hardware-based addition and subtraction of 2-dimensional blocks of data by using an addition and/or subtraction circuit in a 3D graphics rendering module (e.g. pipeline) to add or subtract fragment data values in a memory buffer of the rendering module and data values of subsequently rendered graphics fragments.

Thus, according to a twenty-ninth aspect of the present invention, there is provided a 3D graphics rendering module, comprising:

means for adding or subtracting fragment data values stored in a memory unit of or accessible to the rendering module to or from data values of rendered graphics fragments.

According to a thirtieth aspect of the present invention, there is provided a method of operating a 3D graphics rendering module, comprising:

adding or subtracting fragment data values stored in a memory unit of or accessible to the rendering module to or from data values of rendered graphics fragments.

Again, these aspects of the invention can include any one or more or all of the preferred and optional features of the invention described herein.

In all of the aspects and embodiments of the present invention, the rendering module itself can be any suitable such module and will typically be, as discussed above, a "rendering pipeline". Subject to the need for it to include specific hardware units for carrying out the various functions discussed above, it can otherwise include any one or more or all of the usual functional units, etc., that 3D graphics rendering modules include, such as blending units, fogging units, logic operations units, a depth buffer, etc.

The methods in accordance with the present invention may be implemented at least partially using software e.g. computer programs. It will thus be seen that when viewed from further aspects the present invention provides computer software specifically adapted to carry out the methods hereinabove described when installed on data processing means, and a computer program element comprising computer software code portions for performing the methods hereinabove described when the program element is run on data processing means. The invention also extends to a computer software carrier comprising such software which when used to operate a microprocessor and/or 3D graphics processor system comprising data processing means causes in conjunction with said data processing means said system to carry out the steps of the method of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the method of the invention need be carried out by computer software and thus from a further broad aspect the present invention provides computer software and such software installed on a computer software carrier for carrying out at least one of the steps of the methods set out hereinabove.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

BRIEF DESCRIPTION OF THE DRAWINGS

A number of preferred embodiments of the present invention will now be described by way of example only and with reference to the accompanying drawings, in which.

DETAILED DISCUSSION OF EMBODIMENTS

Figure 1:
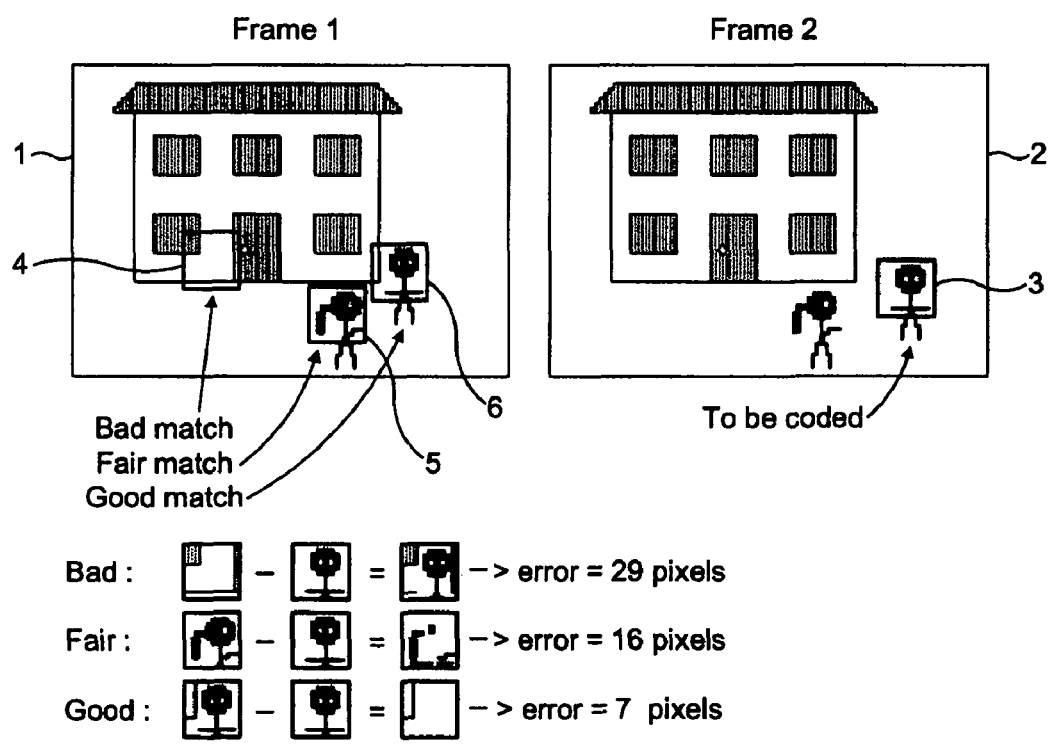
FIG. 1 shows schematically the motion estimation process for video encoding.

A preferred embodiment of the present invention for carrying out data operations necessary for motion estimation and compensation operations in MPEG video data compression and encoding will now be described.

As is known in the art, an MPEG video stream comprises a series of video frames. Each video frame is divided into pixels (picture elements), and in order to be able to display the video frame, video data representing, for example, red, green and blue (RGB) colour values for each pixel in the frame is required. While it would be possible simply to store and handle the video data in RGB format, representing a series of video frames as RGB colour values requires a significant amount of data, and therefore it is known in the art to try to compress the source video data when it is, e.g., encoded for transmission, so as to reduce the amount of data that needs to be transmitted. A number of compression techniques are used for this purpose.

Firstly, the red-green-blue (RGB) video data is usually converted to a luminance/chrominance format (e.g. YUV, where Y is luminance (light information) and U, V are chrominance (colour information)). This is done because the human eye is much more sensitive to luminance than to chrominance, and so when the video data is expressed in this format, the chrominance component can be compressed harder than the luminance component. The chrominance data is typically compressed by halving the frame resolution in both directions for the chrominance components (such that when the data is decompressed, the compressed chrominance components are expanded so that each individual chrominance pixel value is used on a 2×2 grid of luminance pixel values).

Each data component of the video frame is then typically block transformed by dividing the video frame into blocks of typically 8×8 pixels and transforming each block with a frequency transformation function such as a discrete cosine transformation (DCT). The so-obtained frequency components are then decimated and a lossless compression algorithm such as a Huffman algorithm used on the result. These techniques can be used for video compression because "real world" images tend to have less high-frequency image information than low-frequency image information, and thus that information can be removed without unduly affecting the reproduced image.

The above steps are basically "image" compression techniques, since they essentially compress the data within an individual video frame without reference to other frames of the video data. However, as discussed above, differential encoding techniques are also used to further compress the video data.

An important aspect of such differential encoding techniques for video compression is so-called "motion estimation", which, as discussed above, is basically the process of identifying closely similar areas in different video frames, such that then differential encoding can be applied as between those frame areas. In the case of MPEG video encoding, motion estimation is typically done on 16×16 pixel luminance macroblocks at a time (i.e. four 8×8 DCT blocks (which is also the same size as an expanded 8×8 chrominance block)).

The motion estimation process basically involves searching earlier and/or later video frames for an area that is closely similar to an area or block of the video frame currently being compressed. If sufficiently similar frame areas are found, then the data for the area or block of the current frame is not stored in its "original" form, but instead a so-called "motion vector" pointing to the area in the reference or comparison frame that was found to be similar, together with a compressed representation of the differences between the two areas in the video frames, is stored. Then, when the video frame is to be decompressed, the motion vector is used to allow the contents of the area in the reference frame pointed to by the motion vector to be copied to the area (pixel block) in the current frame, with the stored differences between the contents of the current frame and the reference frame being pointed to then being applied to that data so as to recreate the correct pixel data for the current frame.

Thus, in an MPEG video stream, each video frame is subdivided into 16×16 pixel blocks, and for each such pixel block to which motion estimation has been employed, a motion vector pointing to a 16×16 pixel block of pixels in a reference frame (typically the previous and/or next frame) is stored, together with the differences between the contents of the current frame block and the contents of the frame block pointed to by the motion vector.

The usual method of determining a motion vector for a pixel block in video encoding is to pick a number of candidate motion vectors, and to then determine for each candidate vector the sum of the accumulated luminance error values that would result from picking that vector for the differential encoding. This process may be reiterated several times, for example picking a new set of candidate motion vectors based on the results of the previous determinations. The process is continued, e.g., for a predetermined number of candidate motion vectors, and the candidate vector giving the smallest accumulated luminance error (thereby indicating the closest match to the current frame block) is then used for the video encoding.

FIG. 1, which shows an exemplary pair of video frames 1, 2, illustrates this process. The luminance values for the pixels in a pixel block 3 of the current video frame 2 that is to be encoded are compared with the luminance values for a plurality of pixel blocks 4, 5, 6 in an earlier video frame 1 that has been selected as the reference video frame for the differential encoding, and the differences (in terms of the number of pixels whose luminance values do not match) between the pixel blocks being compared are determined. As shown in FIG. 1, there is a cumulative error or difference of 29 "nonmatching" pixels between blocks 3 and 4, an error value of 16 pixels between blocks 3 and 5, and an error value of 7 pixels between blocks 3 and 6.

In this example, the pixel block 6 in the reference frame 1 would accordingly be selected as the reference pixel block on which to base the differential encoding of the current pixel block 3. A motion vector pointing to that pixel block 6 in the reference frame 1 would then be determined and stored for the pixel block 3 in the video frame 2 being encoded, together with the determined differences between the video data values for the current pixel block 3 and the so-identified reference pixel block 6. The motion vector is determined by subtracting the (x, y) position of a reference point (e.g. the top left-hand corner pixel) in the current pixel block 3 from the (x, y) position of the corresponding reference point in the selected reference pixel block 6, i.e. such that the motion vector represents the differences between the x and y positions of the reference points of the two pixel blocks being compared.

As discussed above, the Applicants have recognised that a 3D-graphics rendering module of a 3D graphics processor can be used to hardware accelerate the computationally intensive process of comparing pixel blocks in different video frames that is necessary for the motion estimation process, to hardware accelerate the data difference determinations necessary for differential video encoding, and to hardware accelerate the data addition operations necessary to reconstruct differentially encoded video frames when decoding differentially encoded video data.

As discussed above, the 3D graphics rendering process basically involves deriving a colour value for each pixel to be displayed on a display screen, and typically is carried out by the rendering module performing various operations on discrete graphical entities usually referred to as "fragments" (which will usually each correspond to a single pixel (picture element) in the final display, although that may not always be the case). Each graphics fragment typically has four data values (or "channels") associated with it, for defining red, green, blue colour and alpha (transparency) data values for the fragment. The rendering process basically operates to generate and set the appropriate data values for each fragment to allow the graphics object being rendered to be appropriately displayed.

Figure 2:
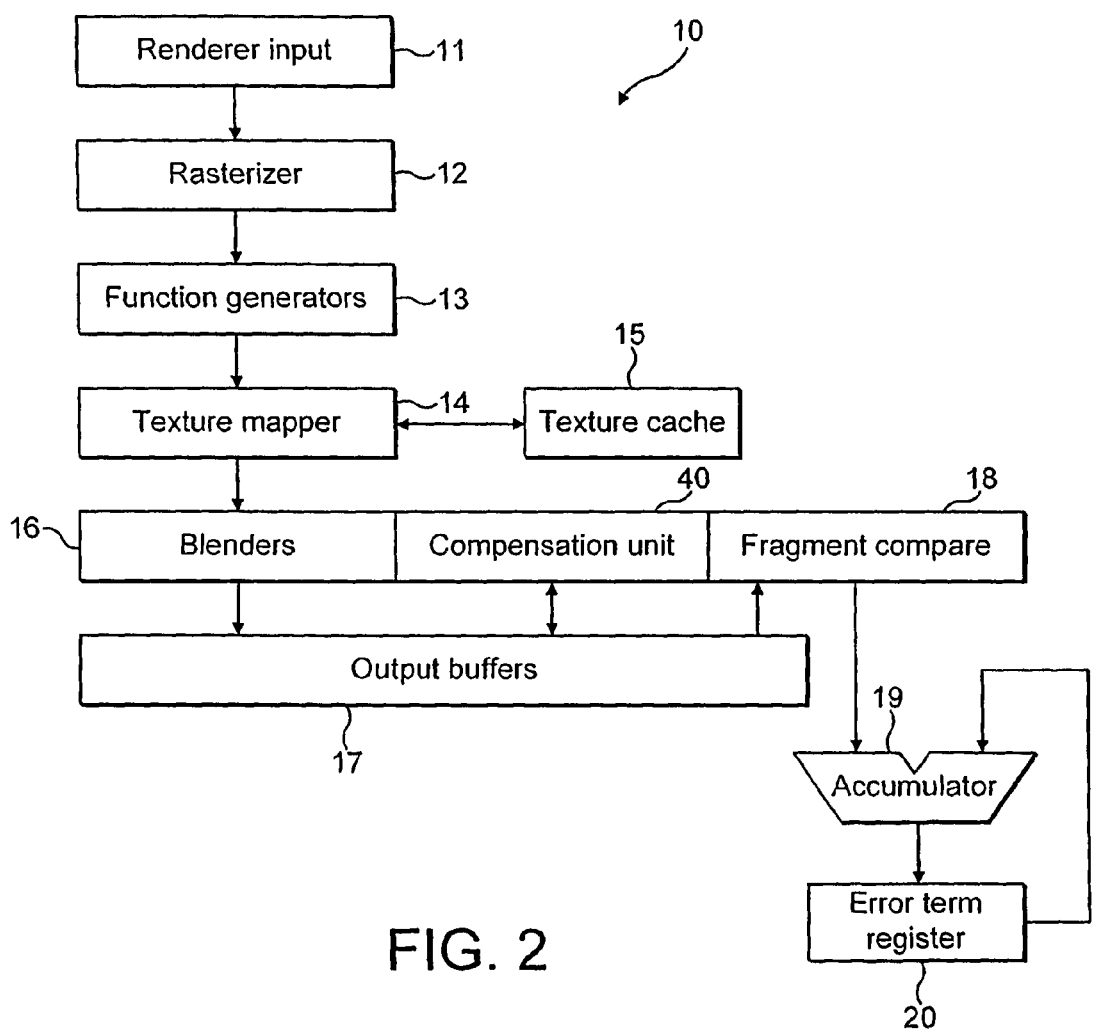
FIG. 2 shows schematically an embodiment of a 3D graphics rendering module that can be used in accordance with the present invention.

FIG. 2 shows schematically a 3D graphics rendering module in the form of a 3D graphics rendering pipeline of a type that would typically be provided on a 3D graphics processor, but which includes a number of modifications in accordance with an embodiment of the present invention to allow it to carry out data comparisons for, for example, motion estimation processes, to allow it to be used to determine the difference data necessary for differential video encoding, and to allow it to, when decoding differentially encoded video data, reconstruct the differentially encoded video frames (i.e. to carry out "motion compensation").

The rendering pipeline 10 includes a renderer input stage 11 which receives from, for example, controlling software running on a host microprocessor, data and commands to render 3D graphics primitives. The renderer input stage 11 includes a bus interface unit which allows the rendering module to access system memory. The bus interface unit contains configuration registers and direct memory access functionality such that it can operate as a bus master after it has been configured properly by the controlling software. In this embodiment all accesses to memory are via the bus interface unit, although it would be possible to instead have dedicated memory interfaces, e.g. for textures.

The rendering input stage 11 also includes a control circuit and renderer state control unit, which sets the rendering state for the rendering module 10 in accordance with the commands and data received by the renderer input stage 11.

In this embodiment, the 3D graphics processor acts as discussed above, as a bus master, and, as soon as it is configured, it operates autonomously. The control data input to the renderer input stage 11 accordingly comprises in this embodiment the memory addresses of the primitive (polygon) lists containing details of the primitives (polygons) to be rendered, information on the resolution to be used, and instructions as to where to write out the processed data, etc.

Once the renderer input stage 11 has received this data, it can then use the supplied memory addresses to retrieve (fetch) the primitive lists. Each primitive list contains as is known in the art, pointers to the memory addresses where the actual primitive data is stored, as well as a pointer to the information that is to be used to set the appropriate rendering state for the rendering module when the primitive in question is rendered.

The renderer input stage 11 then fetches the appropriate renderer state information and the primitive data using the pointers in the primitive list.

Once the data for all the vertices for a given primitive has been obtained, the renderer input stage 11 performs a process commonly referred to as "triangle set up", which, as known in the art, is basically the process of describing the slopes of the line segments between each vertex in the primitive using the supplied data for each vertex. These line segments are then used, as is known in the art, by a rasteriser (see below) to generate the fragment representation of the primitive.

The triangle set up process also determines "line coefficients" for each primitive to allow, e.g., function generators of the rendering module (see below), to interpolate data for points between the vertices of the primitive. These interpolation calculations usually take the form of linear interpolation formulae: $ax+by+c$, where $x$, $y$ are the fragment position in question, and $a$, $b$, $c$ are the "line coefficients" to be used to determine the relevant data value at that position. The values $a$, $b$ and $c$ are rate of change (derivative) values and are calculated in the triangle set up phase by the renderer input stage 11.

This process is repeated until all primitive lists, and thus all the primitives that are to be rendered, have been processed.

It would also be possible to implement this type of arrangement in a 3D graphics rendering module that acts as a bus slave. In that case, the renderer input stage 11 should basically contain a buffer that receives the necessary data, which data is instead determined (where necessary) and sent to the rendering module by the external controlling, e.g., host, processor.

It should be noted in this regard that whether the rendering module can act as a bus master or acts as a bus slave, the "triangle setup" functions discussed above can in either case be carried out by the rendering module, or by an external, e.g., host, processor. Thus, for example, the rendering module could act as a bus master and perform triangle setup itself, in which case the rendering module would itself fetch vertices, vertex data, etc., from memory, or it could act as a bus master but not perform triangle setup itself, in which case the triangle setup data would be provided by the controlling software (e.g. on the host processor), but the rendering module would then fetch that data and put it in the appropriate memory buffer. Similarly, the rendering module could act as a bus slave but still carry out triangle setup itself using the vertices, vertex data, etc., written to the rendering module by the controlling software, or could act as a bus slave and not perform triangle setup, in which case the controlling software would determine the triangle setup data and then write it to a buffer of the rendering module.

In all these arrangements, the renderer input stage 11 provides as output information describing the line segments between each vertex of the primitive to be rendered, together with the necessary interpolation parameters ($a$, $b$, $c$) for the function generators.

The next stage in the rendering pipeline 10 is a rasteriser 12, which converts the graphics primitives provided to the renderer input stage 11 to graphics fragments. The rasteriser 12 uses the line segments determined by (or provided to) the renderer input stage 11 to produce a sequence of ($x$, $y$) coordinate pairs, each pair corresponding to the position of a graphics fragment to be used to render the primitive, for all the ($x$, $y$) positions covered by the primitive. In this embodiment the rasteriser 12 is arranged to be highly efficient at rasterising squares (since, as is known in the art, the frame blocks that differential video encoding uses are square).

The next stage is one or more function generators 13, which, as is known in the art, interpolate functions for rendering the graphics fragments, such as for setting and modifying their textures, colours, etc., using the data associated with each vertex of the primitive being rendered, the line coefficients $a$, $b$, $c$ determined by the renderer input stage 11 in the triangle set up phase, and the $x$, $y$ fragment positions determined by the rasteriser 12, to determine interpolation data necessary for rendering each fragment of the primitive.

The interpolated data is usually one or two of the following: texture map coordinates, primary colour, secondary colour and fog.

Thus, for example, in the case of calculating the texture map coordinates (s_pos, t_pos) for the fragments of a primitive, the function generators 13 will use the texture map coordinates values set for the vertices of the primitive (which are provided by the renderer input stage 11), and a formula of the form ax+ by+c, where a, b and c are the line coefficient rate of change (derivative) values calculated in the triangle set up phase, and x, y is the fragment position determined by the rasteriser 12 for the fragment in question, to determine the appropriate texture map coordinates (texels; s, t) for each fragment of the primitive. In this way, the function generators 13 derive the texture coordinate values for the fragments of the primitive between the vertices by interpolating between the data set for each vertex in an appropriate manner.

The rendering pipeline then includes a texture mapper stage 14. This texture mapper 14, as is known in the art, retrieves texture map data from memory and applies it to the graphics fragments passing down the rendering pipeline 10 in accordance with the determined texture coordinate data (s, t) for each graphics fragment. The texture mapper 14 includes a texture map cache memory 15 in which texture map data can be stored for more rapid retrieval by the texture mapper 14.

In this embodiment, the texture mapping unit 14 is capable of addressing a linear frame buffer, so that the controlling software does not have to convert the raw video data to an interleaved addressing scheme (which is normally the case for texture mappers in 3D graphics, because it is possible to achieve better caching of the data with random access to texture maps; however, this is not necessary for video encoding/decoding, because the data to be operated on is more predictable). The texture mapping unit 14 is also capable of supporting YUV texture formats, so that it can support comparisons of multiple fragments by packing a YUV coded pixel in each RGBA colour channel (i.e. can perform data comparisons in parallel, as discussed above).

The texture mapping unit 14 also includes a bi-linear interpolation circuit, which allows sampling of four texels per fragment. This can be used to enhance image quality during video playback and video scaling, as well as to carry out some motion estimation and compensation operations (as will be discussed further below).

There is then a blending stage 16. This stage, as is known in the art, takes as its inputs the colour value or values of a fragment from the rendering pipeline 10 (after shading and texture mapping of the fragment), and the corresponding colour value that resides in the output buffers of the rendering pipeline (see below) for the corresponding fragment x, y position, and produces a blended version of the colour values of the two fragments. In this embodiment the blending formulae is C_s*S+C_d*D, where C_s is the colour of the incoming rendered fragment and C_d is the colour for the fragment position in the output buffer. The parameters S, D are set by the rendering state defined according to the current rendering state of the rendering pipeline 10.

The rendering module 10 could also include other 3D graphics units such as a Z-test unit, stencil test unit, and/or an early Z-test unit, and Z and stencil buffers (not shown).

The final stage of the rendering pipeline 10 is a set of output buffers 17, where the rendered graphics fragment data (i.e. the red, green, blue, and alpha data values of each rendered fragment) is stored prior to it being provided for display on a display screen. As is known in the art, in the case of tile-based rendering, the output buffers 17 will comprise one or more tile buffers. In the case of immediate mode rendering, the output buffers 17 will comprise one or more cache memories that store the graphics fragment data prior to display.

In this embodiment there are four output buffers, and support circuits are provided such that video data can be loaded directly from memory into these output buffers. (Alternatively, as will be discussed below, it would be possible to render an appropriate primitive with the necessary video data applied to it as a texture map to load the output buffers 17 when performing motion estimation or compensation operations.)

The various components of the rendering pipeline 10 described above are basically, as is known in the art, standard components of a 3D graphics rendering pipeline, and will, when the 3D graphics pipeline is operating normally to render graphics primitives, operate in the normal manner.

FIG. 2 also shows some modifications that have been made to the graphics rendering pipeline 10 in order to allow it to carry out data comparisons, such as are necessary, e.g., for motion estimation.

These modifications include first, the addition of a fragment data compare unit 18. This unit 18 takes as its inputs the data values stored for fragments in the output buffers 17, and the data values of fragments that have been rendered and have reached the end of the rendering pipeline (i.e. the blenders 16), and compares that data. This unit accordingly allows the 3D graphics rendering pipeline of the present embodiment to be used to compare data values of graphics fragments stored in the output buffer or buffers 17 at the end of the graphics pipeline with data values of rendered graphics fragments when they reach the end of the rendering pipeline. It is "activated" to carry out these operations by setting the rendering pipeline 10 to a particular, selected rendering state.

The fragment data compare unit 18 is arranged to determine the differences between the fragment data values stored in each data channel for a given fragment position (i.e. (x, y) coordinate pair) in the output buffers 17, and the fragment data values stored in the respective corresponding data channels of a rendered fragment that has the same fragment position (i.e. (x, y) coordinates).

To do this, the fragment data compare unit 18 identifies when a rendered graphics fragment has the same position (i.e. (x, y) coordinates) as a graphics fragment that is stored in the output buffers 17 (which identification can be done in any suitable manner and is, as is known in the art, a common process in 3D graphics rendering for identifying potentially conflicting or overlapping fragments), and then determines the differences between the value stored in the "red channel" of the rendered fragment and the value stored in the "red channel" of the fragment stored in the output buffer 17, determines separately the difference between the data values stored in the "green channel" of each of those fragments, and so on, and then sums the comparison results.

In other words, the fragment data compare unit 10 carries out a data comparison operation of the form:

R_comparison=|R_rendered-R_buffer|

G_comparison=|G_rendered-G_buffer|

B_comparison=|B_rendered-B_buffer|

A_comparison=|A_rendered-A_buffer| wherein |<value>| is the absolute value of <value>.

The output of the fragment data compare unit 18 is then:

R_comparison+G_comparison+B_comparison+ A_comparison.

The fragment data comparison result (i.e. the sum of the differences between the compared data values for the given fragment (x, y) position) from the fragment data compare unit 18 is output (written) to an accumulator 19 which, as will be described further below, is operable, together with a set of error term registers 20, to accumulate comparison results (i.e. data differences) over a plurality of fragment data comparisons (i.e. for a plurality of different fragment positions ((x, y) coordinate pairs)), and then store and output the accumulated differences for analysis and use.

It will be appreciated from the above that the data input to and the operations carried out by the fragment data compare unit 18 are similar to the data input to and the operations carried out by the blenders 16. It would accordingly be possible to, by appropriate modification and/or configuring of the blenders 16 where necessary, use the blenders 16 to carry out the fragment data comparisons and dispense with the fragment data compare unit 18, if desired. This could be done by e.g., configuring the blenders 16 to carry out the blending function:

rendered_fragment*a+buffer_fragment*b and setting a=1 and b=−1 (i.e. such that the output is rendered_fragment-buffer_fragment) and then taking the absolute value of the subtraction (i.e. making it positive if it is negative).

The rendering module 10 in this embodiment also includes a compensation unit 40, in the form of a 16-bit adder unit. This unit is used, as will be discussed further below, for difference determinations and motion compensation operations. The compensation unit 40 performs arithmetic operations, in this case additions and subtractions, using the fragment data values stored in the output buffers 17, and the fragment data values of rendered fragments output by the texture mapper unit 14, on a fragment-position-by-fragment-position basis. In the present embodiment, the compensation unit operates on 16-bit data values, although other arrangements, such as 32-bits per data value, could be used instead.

Figure 3:
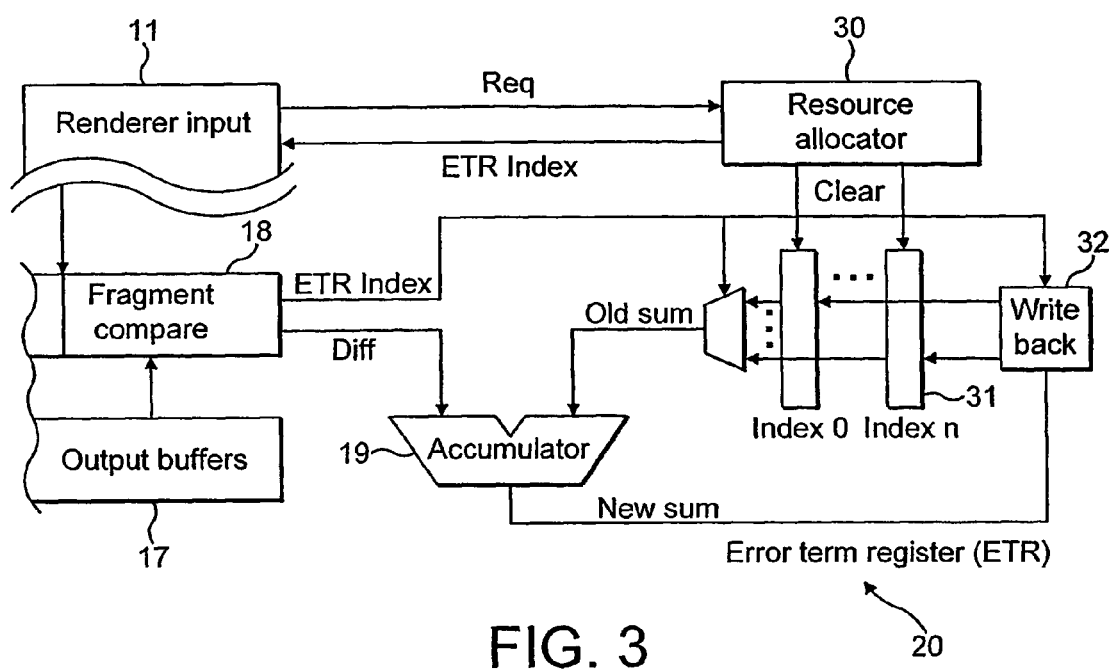
FIG. 3 shows schematically components of the rendering module shown in FIG. 2.

FIG. 3 shows the fragment data compare unit 18, accumulator 19 and error term register 20 in more detail.

As shown in FIG. 3, the error term register 20 includes a plurality of error term register indexes 31, each of which can be used to accumulate and store one set of comparison results over a given block or group of fragment positions. In the present embodiment, there are 16 different error term register indexes 31, although, as will be appreciated by those skilled in the art, any desired and suitable number of error term register indexes 31 could be used.

Each term register index 31 stores at any given time the current accumulated value of the fragment data comparison results that have been allocated to that error term register index. This is done by, when a new fragment position data comparison that is to be stored in the error term register index 31 has been performed, adding, in the accumulator 19, the new difference value so determined to the existing accumulated cumulative difference (error) value already stored in the error term register index 31. The new cumulative difference value is then written back to the error term register index 31 to replace the existing accumulated difference value. This is done under the control of a write back unit 32.

The operation of the rendering module 10 shown in FIG. 2 will now be described.

When using the rendering module 10 for normal 3D graphics operations, the first step is for the controlling software to configure the bus interface unit of the renderer input stage 11 to fetch the relevant 3D graphics data from the desired memory area. (Alternatively, where the bus interface unit is a bus slave, the controlling software would send the data directly to the bus interface unit.)

The rendering module is then set to the rendering state configuration specified by the controlling software by the renderer control unit of the renderer input stage 11. Each geometric primitive is then rasterised and the renderer effects specified by the set rendering state applied to the fragments of the primitive. The rendered fragments are then stored in the output buffers 17, and once those buffers are full, their contents are written to a frame buffer for display.

The use of the 3D graphics rendering pipeline of FIG. 2 to carry out data comparisons for motion estimation in video encoding will now be described.

The first step of this process is to provide the sets of data to be compared to the 3D graphics rendering pipeline in an appropriate form to allow it to carry out the data comparisons. In the case of video encoding, this is firstly done by taking the data values to be compared from source video data (e.g. the luminance values for each pixel position to be compared) and, where necessary, converting that video data to a format suitable for storing in the data channels of graphics fragments in the rendering pipeline. This data selection and formatting (where performed) is carried out by a software application running on, e.g., an external controlling host microprocessor that can access and use the 3D graphics processor.

Once the video data to be compared has been prepared, the software application then configures the rendering module with location data and commands to go and fetch the relevant video data (e.g. luminance data values) for the pixel block of the video frame currently being encoded from memory and load it into the output buffers 17 (i.e. such that the rendering module acts, as discussed above, as a bus master and retrieves the video data from memory itself; it would, of course, be possible instead for that data to be directly provided to the rendering module).

The relevant video data values are in this embodiment directly loaded into the buffers 17, and stored across an array of fragment (x, y) positions corresponding to the size of the pixel block being considered. For each fragment position, the video data for the pixel corresponding to that position that is to be compared is stored in a given data channel or channels of the fragment.

In this embodiment, the luminance value of the pixel to which each fragment corresponds is stored in the red data channel of the respective fragment in the stored fragment array. The green, blue and alpha data channels of each fragment are unused (i.e. set to zero). However, it would be possible to use the green, blue or alpha data channels of each fragment to store the luminance values instead, or, as will be discussed further below, more than one data channel of each fragment could be used to store data values for comparison, if desired.

It would also be possible to cause this data to be stored in the output buffer 17 by rendering an appropriate square primitive for the appropriate fragment (x, y) positions, and using, e.g., the texture mapper 14 such that when the fragments are rendered and stored in the output buffer 17 at the end of the rendering pipeline, they have the appropriate data (e.g. luminance) values in the appropriate data channels. (This type of operation will be described in more detail below with reference to providing the data for comparison with the data stored in the output buffer 17.)

It is preferred in this embodiment to load one copy of the current frame block into each of the four output pixel buffers 17, as that then allows four frame block comparisons to be carried out in parallel. Such parallel processing would also be possible by storing the frame blocks in given areas of the output buffers 17 as well or instead.

The video data (e.g. luminance data) for the comparison pixel blocks from the reference video frame which is to be compared with the data stored in the output buffers 17 is then stored as appropriate texture map values in a memory accessible to the texture mapper 14 of the rendering pipeline. These data values are preferably stored in the texture mapper cache memory 15, since they are likely to be re-used and therefore it is more efficient to store them in the locally accessible cache memory 15.

This pixel data is stored as texels of a texture map or maps, with each texel being allocated a data value representing a pixel data value for a given pixel position in the video frame. The data is arranged such that a graphics fragment to be rendered will, when it is rendered, acquire in its appropriate data channel or channels the data value or values stored for the texel at the texture map coordinate allocated to the graphics fragment. This allows desired data values to be allocated to the rendered graphics fragments by appropriately defining the texture coordinates (i.e. texture map (x, y) positions) of each fragment to be rendered.

Thus, in the present embodiment, the texture map or maps are set up so as to allocate the desired luminance data values to the red data channels of each fragment being rendered. In this way, the texture mapper 14 can be used to allocate the desired pixel data value to a graphics fragment for a given graphics fragment (x, y) position as the graphics fragment is rendered.

Once the sets of pixel data for comparison have been stored in this manner (i.e. one set in the output buffers 17 as a graphic fragment array and the other set or sets as a texture map or maps), the rendering pipeline is controlled to render a primitive having the same fragment (x, y) positions as the fragments in the array of fragments stored in the output buffers 17 over which it is desired to carry out the data comparison. The primitive to be rendered is also defined such that the fragments produced by rasterising it each have associated with them the appropriate texture coordinates such that each fragment will acquire the desired texel data (i.e. video data for comparison) in its red data channel (in this embodiment) from the previously stored texture maps at the texture mapper stage 14.

This is done by the software application that is controlling the data comparison process sending to the graphics processor commands and data to cause it to render an appropriate primitive with texture coordinates corresponding to the data values that it is desired to compare.

The controlling software also sends commands to the 3D graphics processor to set rendering pipeline to a rendering state such that the data values applied by the texture mapper 14 to the rendered fragments end up in an undistorted form at the end of the pipeline for use by the fragment data compare unit 18 (i.e. such that the data values applied by the texture mapper 14 to the fragments being rendered are not changed in any way by the remaining rendering processes, and such that the texture mapper 14 does not distort the data values read from the stored texture maps).

The controlling software also commands the 3D graphics processor to set the rendering pipeline 10 to a state in which the rendered data values at the end of the rendering pipeline in the blenders 16 are not written to the output buffers 17. This allows the data values already stored in the output buffers 17 to be re-used for comparison with subsequent reference frame blocks, if desired.

Once the rendering pipeline has been set to the appropriate "data compare" state, the necessary commands and data to render the primitive to be compared with the data values stored in the output buffers 17 are sent to the renderer input stage 11.

When the renderer input stage 11 receives these commands to render a primitive representing fragment positions whose data values are to be compared, the renderer input stage 11 first sends a request to a resource allocator 30 (see FIG. 3) for an error term register index 31 to be allocated to that primitive for the purpose of accumulating the determined data difference values over the fragment positions of the primitive.

The resource allocator 30 then determines if there are any currently free error term register indexes 31, and if there are, allocates one of the currently free error term register indexes 31 to the primitive. In this embodiment, the resource allocator 30 allocates the error term register indexes 31 in monotonically increasing order, taking into consideration that error term register indexes may be freed in some other order. However, different arrangements would be possible, if desired. If the resource allocator 30 finds that there are no currently free error term register indexes when receiving the request from the renderer input stage 11, then the resource allocator 30 will stall the renderer input stage 11 to prevent the relevant primitive from being rendered, until an error term register index 31 becomes free for use.

Once an error term register index 31 has been allocated to a primitive to be rendered, the identity of that allocated error term register index is provided to the renderer input stage 11, so that the identity of the relevant error term register index can be stored appropriately for the primitive to be rendered (i.e. such that the system can identify which error term register index the determined fragment data differences should be accumulated in).

The resource allocator 30 also enables at this stage a "primitive enable flag" associated with the allocated error term register index, so as to indicate that that error term register index has been allocated to a primitive currently being rendered. This primitive enable flag is cleared when the last fragment of the primitive enters the rendering pipeline.

Each error term register index 31 also has a "fragment counter" associated with it, which is used to record the number of fragments belonging to the corresponding primitive (i.e. effectively that error term register index) that are currently in the rendering pipeline. This fragment counter together with the primitive enable flag allows the resource allocator 30 to determine if and when all the fragment positions for the primitive have been compared (since once the primitive enable flag and the fragment number are both zero, that indicates that all the fragment positions have been rendered and compared).

The renderer input stage 11 can now send the primitive through the rendering pipeline where it is rendered and the relevant fragment data comparisons carried out and the determined differences in the data values accumulated in the allocated error term register index.

Once all the data comparisons for the primitive have been finished and the accumulated total data difference value stored in the allocated error term register index 31, the resource allocator 30 notes that the relevant data comparisons have been finished, and, accordingly, that the value in the allocated error term register index 31 can now be exported, to, e.g., external memory, for analysis and use. In the present embodiment, the resource allocator 30 waits until there are 8 error term register indexes storing final values before the values are exported, as that allows the final difference data to be exported in convenient 8-beat bursts. However, other arrangements could be used if desired, although generally it is preferred for more than one error term register index value to be exported to memory at any given time.

Once the final difference sum value stored in an error term register index 31 has been exported, that error term register index is freed by the resource allocator 30 ready for allocation to a new primitive to be rendered.

The final difference sum values exported from the error term register indexes 31 comprise both the final error difference value and an identifier indicating the primitive (i.e. data comparison set) to which the difference sum value relates. In the present embodiment, this information is written back as a tuple consisting of a primitive index identifier and the difference sum value. Each tuple is written out as a one 32-bit word, with the upper 16 bits being the primitive index, and the lower 16 bits being the accumulated total difference value for the primitive.

The resource allocator 30 is also arranged to export the values in the error term register indexes 31 in the event that the rendering pipeline 10 enters a particular state or states, such as it going "idle", to try to avoid any stored difference data being lost in those circumstances. As will be appreciated by those skilled in the art, this may in some circumstances lead to the error term register indexes exporting essentially meaningless garbage where, for example, they are not currently in use to accumulate difference values. However such garbage can be relatively easily identified in any software application that is used to analyse the exported data.

It will be appreciated that in this embodiment, the error term register indexes 31 simply accumulate the absolute differences between the pairs of fragment data being compared for each individual fragment position over all of the fragment positions being compared, i.e. in effect the rendering pipeline is operated to carry out a sum of absolute differences (SAD) cost function over the set of fragment positions being compared. However, the sum of absolute differences value that is exported by the error term register indexes 31 could, for example, be converted to a mean absolute difference value by, for example, the software application that is used to analyse the exported value first dividing that value by the number of individual fragment data comparisons that were carried out.

Alternative forms of difference comparison and cost functions, such as a mean-squared difference (MSD) function which squares the difference between the fragment data for the fragment position, accumulates the squared differences and then takes their mean, could also be used, if desired, although that may require some modification to the illustrated renderer pipeline hardware.

The above process is then repeated for each of the plural different blocks of the reference video frame with which it is desired to carry out the data comparisons (which will each correspond to a given candidate motion vector).

To do this, the controlling software sends to the 3D graphics processor at the beginning of the data comparison operation commands to render a series of primitives, each corresponding to one given reference frame block (i.e. candidate motion vector). Each such primitive will accordingly cover the same set of fragment (x, y) positions, but have different texture coordinates (and/or texture maps) for those fragment positions, such that the rendered primitive will represent a different set of source data. Preferably a list of the plural primitives to be rendered (i.e. candidate motion vectors to be tried) is stored in a look-up table (as a primitive (polygon) list or lists, as discussed above) that is accessed by the renderer input stage 11 as appropriate.

Once all the desired data comparisons have taken place (or, as discussed above, at least a group of 8 such comparisons has been carried out), then the results are exported to an external memory for analysis and use. The exported data comparison results can be used as desired, and, in the case of motion estimation, can, as discussed above, be used to determine which reference frame block should be used for encoding the current frame block being considered.

The above embodiment stores data values for comparison in the red data "channels" of each fragment being compared, and leaves the remaining data channels of each fragment unused. However, as discussed above, it would be possible also to configure the rendering pipeline to compare data in more than one data channel of each fragment, if desired. This would require, for example, some modification in the way that the data is stored both in the output buffer 17 and the texture mapping unit 14, so as to provide the appropriate data values to each data channel being used for each fragment. The fragment data compare unit 18 and the error term register indexes 31 may also need to be modified or controlled appropriately to allow data comparisons between plural data channels for each fragment position to be carried out.

In an arrangement where plural data channels for each fragment position are being considered, it would be possible, for example, to store the luminance value for a given pixel position in, e.g., the red data channel, and the corresponding chrominance values in the green and blue data channels, of each fragment. Those values would then each be compared individually, thereby providing a more detailed assessment of the differences between the pixel blocks being compared.

Alternatively, it would, for example, be possible to store the luminance values from a plurality of different pixel positions in the source video data (e.g. up to 4) for a given fragment position that is being compared, by placing the luminance value for one pixel position in the red data channel of the fragment, the luminance value for a second pixel position in the green data channel of the fragment, and so on. By configuring the rendering pipeline to compare the different data channels individually, a single fragment compare operation could then be used to compare the luminance values of plural pixel positions in the source video data.

Thus, for example, it would be possible to treat the pixels in the source video data in pairs, by writing the luminance value for the left pixel of the pair in the red data channel of each fragment, and the luminance value for the right pixel in the pair in the blue data channel of each fragment (with the green and alpha data channels still being unused), and then carry out the comparison operations. This would allow, for example, where 16×16 pixel blocks in the source video data were being considered, the data comparisons to be carried out using 8×16 fragment blocks per reference frame block to be tested (rather than having to render and compare 16×16 fragment blocks), and accordingly effectively approximately double the processing performance.

When operating in this mode, the original data would need to be prepared appropriately, to allow the luminance values for the two different pixels to be appropriately stored for the fragment positions both in the output buffers and for each texel in the stored texture maps. It would also be necessary to generate two texture maps for each reference frame, one for even-numbered pixel offsets in the x direction, and one for odd-numbered pixel offsets.

Similarly, where the 3D graphics processor and rendering module being used has the ability to handle plural fragments simultaneously (e.g. because it treats each fragment as actually consisting of a number of "sub-fragments" that can each store individual fragment values), and the, e.g., texture mapping unit 14 can read the necessary number of sub-fragment values in each access, then these features could again be exploited to store for each fragment position plural data values from the source data being compared to again effectively process the source data in parallel.

Thus, for example, where the rendering module treats fragments as comprised of four sub-fragments, then for testing a 16×16 pixel block of source data, that block could be stored as an 8×8 fragment block in the rendering pipeline, with each rendering pipeline fragment holding data for 2×2 pixels from the source pixel block.

As discussed above, the rendering module 10 shown in FIG. 2 can also be used to carry out the difference determinations necessary for differential video frame encoding, and then the corresponding motion compensation operations to allow reconstruction of the video frame block when decoding differentially encoded video data.

As is known in the art, once the necessary motion vector and reference video frame block for differential video encoding have been determined, it is also necessary to determine the differences between the video data values for each pixel position in the current frame block and the determined reference frame block, so that those differences can also be encoded and, e.g., provided to the recipient for reconstructing the video frame. The advantages of this operation is that by simply encoding the differences, a large amount of data can be reduced to zeros or very small values, which can be compressed relatively easily.

The reverse process is then carried out when reconstructing the video data when decoding it, i.e. the encoded difference values are added to the reference frame values to reconstruct the current frame. The rendering module 10 shown in FIG. 2 can be used to hardware accelerate both these operations.

In the case of determining the difference values for video encoding, the video data values for the current frame block are loaded into the output buffers 17, as for the motion estimation process. The reference frame block values for the known reference frame to be used for the video encoding (which will have been determined previously by a motion estimation process) are provided as appropriate texture map values to the texture cache 15, and then, as for the motion estimation process, the rendering pipeline is set to render a primitive corresponding to the reference frame block such that when the fragments of that primitive leave the texture mapper unit 14, they have the appropriate video data values. (The remaining functional units of the rendering module 10 are set, as discussed above, so as to pass the relevant data through unchanged.)

However, rather than using the fragment compare unit 18 to determine an overall error or difference sum for the fragment positions, the compensation unit 40 is used instead to determine and output the difference between the data values for each fragment position individually, by subtracting the data values for the rendered fragments from the data values for the stored fragments (such subtraction is in practice carried out by, as is known in the art, making the data values for the rendered fragments negative and then adding the two data values together). These difference values can then be exported, and/or written back to the output buffers 17 for retrieval, for encoding as normal for differential video encoding.

As the difference values used for video encoding are determined for each of the Y, U and V values of the video data, this process is repeated for each of the Y, U and V values for the current frame block and reference frame block. This can be done either by carrying out three "passes" down the rendering module in succession, or by processing the Y, U and V values appropriately in parallel. Since U and V values normally operate at half the resolution of the luminance (Y) values, then in the case of MPEG video encoding, for example, the difference determinations are carried out on 8×8 fragment blocks for the U and V values, instead of 16×16 fragment blocks.

To facilitate processing each of the Y, U and V values, the reference frame is stored as three separate texture maps, one for each of the Y, U and V components.

As discussed above, the reference frame block used for this process is determined from the previously determined motion vector (which is derived in the motion estimation process). Where the motion vector includes a half-pixel offset (which can be the case in motion estimation) the texture mapper unit 14 is arranged to perform bi-linear interpretation of the actually provided video pixel data values, to derive the necessary value for the offset pixels of the reference frame block.

In the case of motion compensation operation, i.e. reconstructing the current frame block from a provided reference frame block and a set of difference values, the data difference values for each fragment position are loaded in the output buffers 17, and the reference frame values are again provided by storing them as appropriate texture maps and rendering appropriate primitives. Again, the texture mapping unit 14 can carry out bi-linear interpolation where the relevant motion vector defines a reference frame with a half-pixel offset.

In this case, the rendered data values for each fragment position from the texture mapper unit 14 and the corresponding difference values stored as fragment data values for each fragment position in the output buffers 17 are added together for each respective fragment position being considered in the compensation unit 40, thereby recreating the data values for the current frame block for each fragment position, such that that frame block can be reproduced. The recreated current frame block data values can then be, e.g., exported from the compensation unit 40, or written back to the output buffers 17 for output or retrieval, for subsequent processing and display.

This process should again be repeated for each of the Y, U, and V values of the frame block, or the three values should be processed in parallel, as discussed above.

The renderer module 10 of the present embodiment can also be used to perform bi-directional motion compensation. As is known in the art, when doing motion compensation of an, for example, MPEG video stream, the reference frame block can be a block from the previous frame, a block from the next frame, or a blend of blocks from the previous and next frames. The latter case is referred to as bi-directional motion compensation.

As discussed above, in the present embodiment, if the reference frame block is simply from a previous or next frame, then the rendering module 10 is operated to carry out a simple subtraction between the current frame block and the reference frame block (when encoding, resulting in difference data), or a simple addition between the difference values and the reference frame block (when performing motion compensation decoding).

However, in the case of bi-directional motion compensation, it is first necessary to blend together blocks from the previous and next frames before the addition or subtraction stage, in order to produce the reference frame block that is to be used for the encoding or decoding. The present embodiment uses the blending unit 16 to carry out this task.

To facilitate this form of operation, the current, next and previous frame blocks are all stored as texture maps in the texture cache 15, and the rendering module 10 is configured so that it can support and carry out the following functions (where R is the output value of the operation that in this embodiment is written to the output buffers 17, A is the data value currently stored in the output buffers 17, and T is the data values provided by rendering fragments using the stored texture maps):

R=T—this mode is used to copy data from the texture map to the output buffers 17

R=A+T—this is the addition mode used for frame decoding

R=A−T—this is the subtraction mode used for determining the difference values for encoding R=(A+T+1)/2—this is the blending mode for blending together the previous and next frame to produce the desired bi-directional reference frame block.

The above modes of operation are used in the following manner to carry out bi-directional motion compensation. Firstly, the above "copy mode" is used to load data for the previous frame block into the output buffer 17, and then the "blending mode" is used to blend that data with the frame block from the next frame (which is taken from the relevant stored texture map) to produce and store in the output buffers 17 the desired bidirectional reference frame block.

The subtraction mode above can then be used to determine the necessary difference values using the determined bidirectional reference frame block, by rendering the current frame values using the relevant texture map. Similarly, for decoding, the addition mode can be used to add the so-determined bidirectional reference frame block to the appropriate difference values by rendering fragments having those difference values using the relevant stored texture map.

It would also be possible to provide a bidirectional reference frame block in other ways, for example by using "multi-texturing" capabilities of the rendering module (if present), as discussed above.

Figure 4:
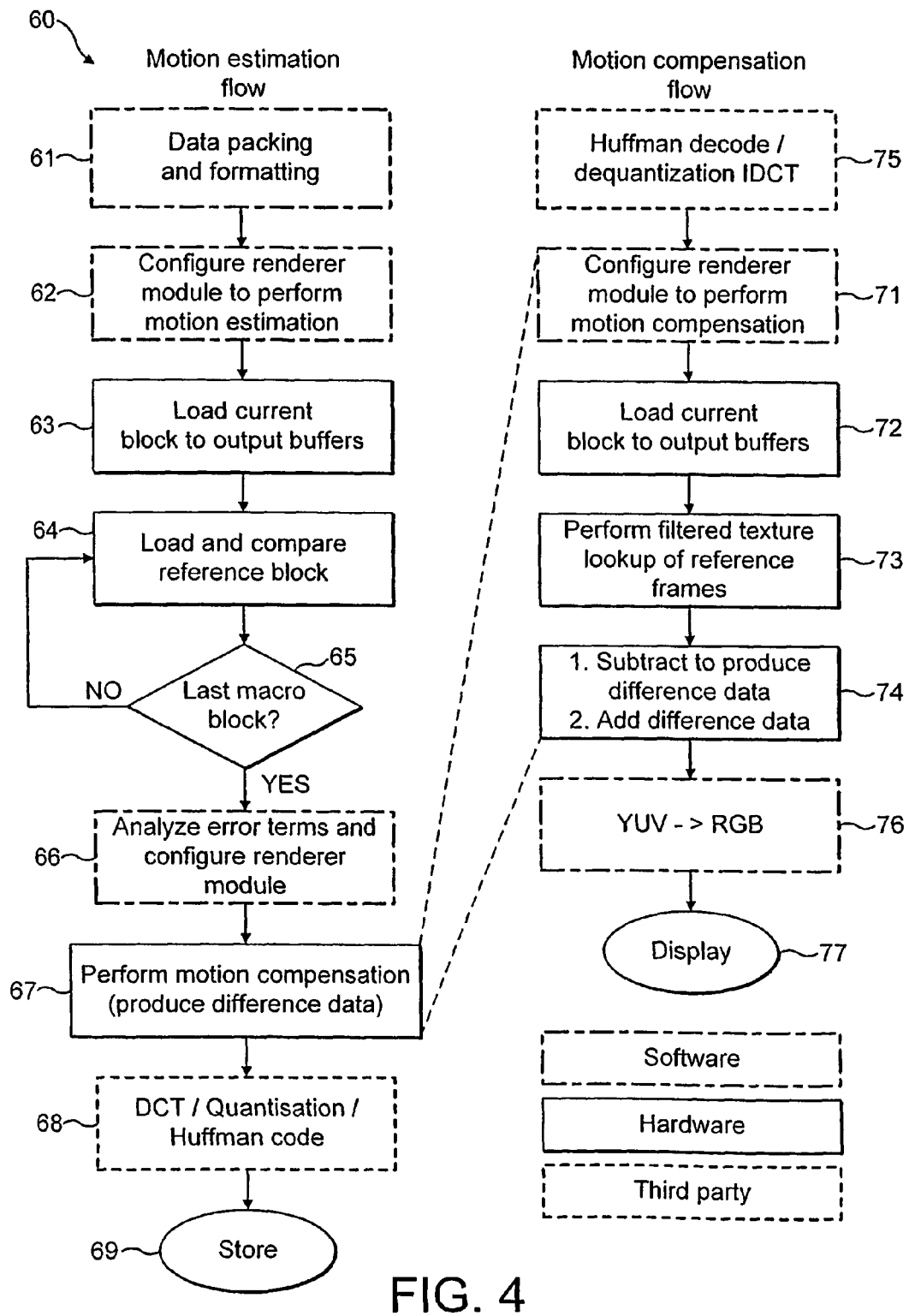
FIG. 4 is a flow chart showing the steps of the 3D graphics motion estimation and motion compensation processes that can be performed by the 3D graphics rendering module of FIG. 2.

FIG. 4 is a summary flow chart showing the various steps that the rendering module 10 carries out for both motion estimation and motion compensation.

As shown in FIG. 4, the first step in the motion estimation flow 60 is to carry out the relevant video data packing and formatting (step 61) which is then followed by a step 62 of configuring the rendering module to perform motion estimation. The current frame block to be encoded is then loaded to the output buffers at step 63. The successive reference blocks are then loaded and compared with the current output block (step 64) until the last comparison has been made (step 65).

At that stage the error terms are analysed and the reference frame block to be used for encoding selected and the rendering module then configured to determine the difference data for encoding (step 66). The difference data determinations are then performed (step 67). (This will be discussed in more detail below).

The determined difference values and motion vector are then subject to further encoding such as discrete cosine transformations, quantisations and Huffman coding (step 68). The encoded video data is finally stored (step 69).

The right-hand side of FIG. 4 shows the steps for encoding and decoding for motion compensation.

Firstly, considering the steps necessary to produce the difference data for encoding (which are all steps carried out as part of step 67 above), the first such step is to configure the rendering module to perform the necessary motion compensation operation (step 71). The current frame block is then loaded into the output buffers (step 72), and the already determined reference frame block is then rendered (step 73), with, in the case of encoding, the rendering module operating to subtract the data values for each fragment position to produce the necessary difference data (step 74). That difference data is then encoded, as discussed above, together with the motion vector (step 68).

In the case of decoding, i.e. reproducing the video data from provided difference data and a motion vector, the steps are similar, but as shown in FIG. 4 there is first a Huffman decoding, dequantisation and inverse discrete cosine transformation step 75, if necessary. The rendering module is then again configured to perform the motion compensation operations (step 71). However, in this case, the difference values are then loaded to the output buffers for the current frame block in step 72. The reference frame indicated by the motion vector is then again rendered using the appropriate texture map values in step 73, but in this case is then "added" to the difference data in the output buffers at step 74 to recreate the current frame values. The so-recreated Y, U, V data values are then converted at step 76 to RGB values ready for display at step 77.

The present invention is applicable to any form of rendering module that can handle graphics fragments in the appropriate manner. Thus it is particularly suited to "local" renderers (as against "global" rendering systems such as ray-tracing). It is equally applicable to renderers which have "fixed" rendering functions and to renderers which have varying degrees of (or even full) programmability in use (or by an application developer) such as "pixel shader" and "fragment shader" hardware renderers.

Although the present invention has been described above with particular reference to video encoding and decoding and the motion estimation and motion compensation processes of such encoding and decoding, as will be appreciated by those skilled in the art, the present invention is applicable wherever it is necessary to, e.g., compare or modify two-dimensional arrays of data, such as in, for example, two-dimensional pattern recognition processes. The present invention is advantageous for such processes, since it uses the existing hardware features of 3D graphics rendering modules to hardware accelerate the necessary calculations and mathematical operations.

The invention claimed is:

1. A method of operating a microprocessor in a microprocessor system comprising a 3D graphics processor and a microprocessor that can control 3D graphics processor, the method comprising the steps of:

selecting sets of data values for comparison;

storing one of the selected sets of data values as fragment data for a plurality of positions in a graphics fragments array in a memory unit or accessible to the 3D graphics rendering module;

storing the other selected set or sets of data values as texture map values in memory unit accessible to a texture mapping unit of the 3D graphics rendering module;

rendering a 3D graphics primitive such that the fragments of the primitive have the same fragment positions as the stored data values in the memory unit and acquire desired data values from the stored texture map values as the are rendered;

comparing the rendered primitive fragment data values with the data values for the corresponding fragment positions stored in the unit of or accessible to the 3D graphics rendering module and determining the differences between the data values being compared for each fragment position; and accumulating the determined differences for said data values for said plurality of fragment positions and providing an overall accumulated difference value for said plurality of fragment positions for said sets of data values being compared.

2. A method of operating a microprocessor in a microprocessor system comprising a 3D graphics processor and a microprocessor that can control 3D graphics processor, the method comprising the steps of:

selecting blocks of pixel data values from two or more video frames of a video sequence for comparison;

storing one of the selected pixel data values blocks as fagment data for a plurality of positions in a graphics fragments array in a memory unit of or accessible to the 3D graphics rendering module;

storing the other selected pixel data value block or blocks as texture map values in a memory unit accessible to a texture mapping unit of the 3D graphics rendering module;

rendering a 3D graphics primitive such that the fragments of the primitive have the same fragment positions as the stored pixel data values in the memory unit and acquire desired pixel data values from the stored texture map values as they are rendered;

comparing the rendered primitive fragment data values with the data values for the corresponding fragment positions stored in the memory unit of or accessible to the 3D graphics rendering module and determining the differences between the data values being compared for each fragment position; and accumulating the determined differences for said fragment data values for said plurality of fragment positions and providing an overall accumulated difference value for said plurality of fragment positions for said blocks of pixed data values being compared.

3. A method of performing motion estimation for differential encoding of frames of video data, said method comprising the steps of:

storing in a memory unit of or accessible to a 3D graphics rendering module a set of graphics fragment data values for a plurality of fragment positions representing video data values for a pixel block from a frame of the video data;

rendering using the 3D graphics rendering module one or more graphics fragments having the same fragment positions as the fragments in the stored set of graphics fragment data values such that they acquire fragment data values representing video data values for a pixel block from another frame of the video data;

comparing said fragment data of the rendered fragments with the fragment data stored for the fragments in the corresponding fragment positions in the stored set of graphics fragment data values and determining the differences between the data values being compared for each fragment position; and accumulating the determined differences for said plurality of fragment positions, and providing an overall accumulated difference value for said plurality of fragment positions for said video data values being compared, comprising using each pair of fragments whose data values are to be compared to compare luminance and chrominance values for a given pixel position in the video data to be encoded, or to compare luminance values for more than one pixel position in the video data to be encoded.

4. A method of performing motion estimation for differential encoding of frames of video data, said method comprising the steps of:

storing in a memory unit of or accessible to a 3D graphics rendering module a set of graphics fragment data values for a plurality of fragment positions representing video data values for a pixel block from a frame of the video data;

rendering using the 3D graphics rendering module one or more graphics fragments having the same fragment positions as the fragments in the stored set of graphics fragment data values such that they acquire fragment data values representing video data values for a pixel block from another frame of the video data;

comparing said fragment data of the rendered fragments with the fragment data stored for the fragments in the corresponding fragment positions in the stored set of graphics fragment data values and determining the differences between the data values being compared for each fragment position; and accumulating the determined differences for said plurality of fragment positions, and providing an overall accumulated difference value for said plurality of fragment positions for said video data values being compared, including the further step of defining a 3D graphics primitive corresponding to the fragments to be rendered, and then passing that primitive through the rendering module in such a way that the fragments generated for the primitive have, when they have been rendered, the relevant fragment data values.

5. The method of claim 4, comprising:

storing the data values for the block of the video frame currently being encoded in the memory unit of or accessible to the rendering module; and rendering fragments such that they acquire data values representing successive sets of pixel blocks from the reference video frame.

6. The method of claim 4, comprising comparing the data values in the stored fragment array and data values of the rendered fragments in a data comparison unit or units that has been added to the rendering module for that purpose.

7. The method of claim 4, comprising using two or more data channels for each fragment for the data processing.

8. The method of claim 4, comprising using a pair of fragments whose data values are to be compared or modified, to compare, or modify, plural different data values from the video data values that are to be compared or modified.

9. A method of performing motion estimation for differential encoding of frames of video data, said method comprising the steps of:

storing in a memory unit of or accessible to a 3D graphics rendering module a set of graphics fragment data values for a plurality of fragment positions representing video data values for a pixel block from a frame of the video data;

rendering using the 3D graphics rendering module one or more graphics fragments having the same fragment positions as the fragments in the stored set of graphics fragment data values such that they acquire fragment data values representing video data values for a pixel block from another frame of the video data;

comparing said fragment data of the rendered fragments with the fragment data stored for the fragments in the corresponding fragment positions in the stored set of graphics fragment data values and determining the differences between the data values being compared for each fragment position; and accumulating the determined differences for said plurality of fragment positions, and providing an overall accumulated difference value for said plurality of fragment positions for said video data values being compared, wherein the fragment data values for the fragments that are rendered are generated for those fragments by writing the data values as a texture map or maps that are then applied to the fragments as they are rendered.

10. The method of claim 9, wherein the method is used for encoding or decoding of frames of video data values, and further comprises storing pixel data values for a current video frame block, pixel data values for a preceding reference video frame block, and pixel data values for a succeeding reference frame video block, as texture map values.

11. An apparatus for controlling the operation of a 3D graphics rendering module, the apparatus comprising:
- means for selecting blocks of pixel data values from two or more video frames of a video sequence for comparison;
- means for causing one of the selected blocks of pixel data values to be stored as fragment data for a plurality of positions of a graphics fragments array in a memory unit of or accessible to the 3D graphics rendering module;
- means for causing the other selected pixel data values block or blocks to be stored as texture map values in a memory unit accessible to a texture mapping unit of the 3D graphics rendering module;
- means for causing the 3D graphics rendering module to render a 3D graphics primitive such that the fragments of the primitive have the same fragment positions as the stored pixel data values in the memory unit and acquired desired pixel data values from the stored texture map values as they are rendered;
- means for causing the 3D graphics rendering module to compare the rendered primitives fragment data values with the data values for the corresponding fragment positions stored in the memory unit of or accessible to the 3D graphics rendering module and to determine the differences between the data values being compared for each fragment position; and
- means for causing the 3D graphics rendering module to accumulate the determined differences for said data values for said plurality of fragment positions and for providing an overall accumulated difference value for said plurality of fragment positions for said blocks of pixel data values being compared.

12. A non-transitory computer readable storage medium for storing a computer program element comprising computer software code portions for performing the method of claim 1 when the program element is run on data processing means.

13. A non-transitory computer readable storage medium for storing a computer program element comprising computer software code portions for performing the method of claim 4 when the program element is run on data processing means.

14. A method of performing motion estimation for differential encoding of frames of video data, said method comprising the steps of:
- storing in a memory unit of or accessible to a 3D graphics rendering module a set of graphics fragment data for a plurality of fragment positions representing video data for a pixel block from a frame of the video data;
- rendering using the 3D graphics rendering module one or more graphics fragments having the same fragment positions as the fragments in the stored set of graphics fragment data such that they acquire fragment data representing video data values for a pixel block from another frame of the video data;
- comparing said fragment data of the rendered fragments with the fragment data stored for the fragments in the corresponding fragment positions in the stored set of graphics fragment data and providing a comparison measure for fragment data at each fragment position; and
- accumulating the comparison measures for said fragment data at a plurality of fragment positions, and providing an overall comparison measure for said fragment data at said plurality of fragment positions, wherein the fragment data for the fragments that are rendered is generated for those fragments by writing that data as a texture map or maps that is then applied to the fragments as they are rendered, wherein the method is used for encoding or decoding of frames of video data, and further comprises storing pixel data for a current video frame block, pixel data for a preceding reference video frame block, and pixel data for a succeeding reference frame video block, as texture map values.

\* \* \* \* \*